United States Patent
Leung et al.

(10) Patent No.: US 7,418,451 B2
(45) Date of Patent: *Aug. 26, 2008

(54) E-COUPON SERVICE FOR LOCATION-AWARE MOBILE COMMERCE WHICH DETERMINES WHETHER TO SUPPLY REQUESTED E-COUPONS BASED ON THE NUMBER OF REQUESTS RECEIVED IN A PROCESSING CYCLE, AND A THRESHOLD NUMBER OF REQUESTS REQUIRED TO MAKE EXPECTED RETURNS FROM REDEEMED COUPONS GREATER THAN ADVERTISING FEES

(75) Inventors: Kin K. Leung, Edison, NJ (US); Hui Luo, Marlboro, NJ (US); Nemmara K. Shankaranarayanan, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/245,635

(22) Filed: Oct. 7, 2005

(65) Prior Publication Data

US 2006/0036491 A1 Feb. 16, 2006

Related U.S. Application Data

(63) Continuation of application No. 10/002,999, filed on Nov. 2, 2001, now Pat. No. 6,996,579.

(51) Int. Cl.
*G06F 17/30* (2006.01)
*G06F 15/16* (2006.01)

(52) U.S. Cl. ................... 707/100; 707/101; 707/102; 707/104.1

(58) Field of Classification Search .............. 707/100, 707/101, 102, 104.1
See application file for complete search history.

(56) References Cited

U.S. PATENT DOCUMENTS

| 5,404,502 A | 4/1995 | Warner et al. |
| 6,035,280 A | 3/2000 | Christensen |
| 6,055,513 A | 4/2000 | Katz et al. |

(Continued)

OTHER PUBLICATIONS

Jack Deal, "The Break-Even Point and The Break-Even Margin" http://www.dealconsulting.com/finance/break.html.

(Continued)

*Primary Examiner*—Tony Mahmoudi

(57) ABSTRACT

A conditional e-coupon distribution method distributes e-coupon predefined by sellers to mobile users only if the number of mobile users requesting such e-coupons equals or exceeds a threshold. The method receives a request to browse e-coupons from a mobile user. The method receives the location of the mobile user and determines a plurality of sellers local to the mobile electronic device and a plurality of corresponding e-coupons available from the local sellers. The method receives a request for a particular e-coupon from a seller and authorizes the provision of said e-coupon to the mobile user. At the end of a processing cycle, the mobile user receives the requested e-coupon if all conditions, such as a period of time and threshold, have been met. A computer-usable medium having computer-readable program code embodied therein allows for storage of the method.

15 Claims, 16 Drawing Sheets

U.S. PATENT DOCUMENTS

| | | | |
|---|---|---|---|
| 6,057,872 | A | 5/2000 | Candelore |
| 6,101,484 | A | 8/2000 | Halbert et al. |
| 6,269,343 | B1 | 7/2001 | Pallakoff |
| 6,298,329 | B1 | 10/2001 | Walker et al. |
| 6,366,891 | B1 | 4/2002 | Feinberg |
| 6,493,722 | B1 | 12/2002 | Daleen et al. |
| 6,631,356 | B1 | 10/2003 | Van Horn et al. |
| 2002/0065713 | A1* | 5/2002 | Awada et al. ............ 705/14 |
| 2002/0082946 | A1 | 6/2002 | Morrison et al. |
| 2002/0091468 | A1 | 7/2002 | Kraft et al. |
| 2002/0111172 | A1 | 8/2002 | DeWolf et al. |
| 2002/0116271 | A1 | 8/2002 | Mankoff |
| 2002/0161641 | A1 | 10/2002 | Quinlan et al. |
| 2003/0220835 | A1 | 11/2003 | Barnes, Jr. |

OTHER PUBLICATIONS

NJO Enters World of Mobile Commerce—GeePS Meets Retail's Wireless Demands, Jun. 19, 2000, printed Feb. 7, 2002 http://www.cellular.co.za/news 2000/news-06192000 new jersey location services.htm, 1 page, New Jersey.

WAIS Document Retrieval, Code of Federal Regulations, U.S. gov. Printing Off. via GPO Access, Cite: 47 CFR20.18, Telecommunication Commission, Part 20—Commercial Movile Radio Srvices—Table of Contents, Sec. 20.18, 911 Service, Title 47, vol. 2, pts 20-39, rev'd Oct. 1, 2000, 3pp. http://frwebgate.access.gpo.gov/cgi-bin/get-cfr.cgi.

Alcatel to Demonstrate INsight Platform using NearMe Wireles Application at m-Commerce 2000, Sep. 2000, http://www.gls development.net/news/2000/sep/alcatel.htm.

Patricia Jacobus, Courtney MacAvinta and Evan Hanse, CNET News. com, Tech News, Is DoubleClick privacy plan adequate?, Feb. 14, 2000, 4 pp. http://news.com.com/2100-1023-236895.html?legacy=cnet.

SkyGo Announcements, SkyGo study Suggests Wireless Advertising May be Catalyst to Widespread Consumer Use of Wireless Web, Dec. 18, 2000, 2 pp. http://www.skygo.com/news/pr00 1218.html.

Commerce on the Move: Location Based Services, Piracy Concerns Plague Emerging Location Technology, Oct. 25, 2000—Wireless Data News, 2pp., http://www.telecomweb.com/reports/cotm/commerce1.htm.

QiBi, George I. Zysman and Hank Menkes, Lucent Technologies, Wireless Mobile Communications at the Start of the 21st Century, Telecommunications Networking at the Start of the 21st Century, vol. 39, No. 1, pp. 110-116, Jan. 2001.

GSM: Global Sysstem for Movile Communications, Digital Cellular Telecommunications System (Phase 2+); Technical realization of Short Message Service Cell Broadcast (SMSCB), GSM 03.41 version 5.8.1, 30 pp., ETS 300 902 European Telecommunications Standards Institute Jun. 1998, 4th ed.

GSM: Global System for Mobile Communications, Digital Cellular telecommunications Sysem (Phase 2+); Technical realization of Short Message Service Point-to-Point (PP), GSM 03.40 version 5.8.1 Release 1996, 113 pp., ETS 300 901 European Telecommunications Standards Institute Dec. 1998, 5th ed.

* cited by examiner

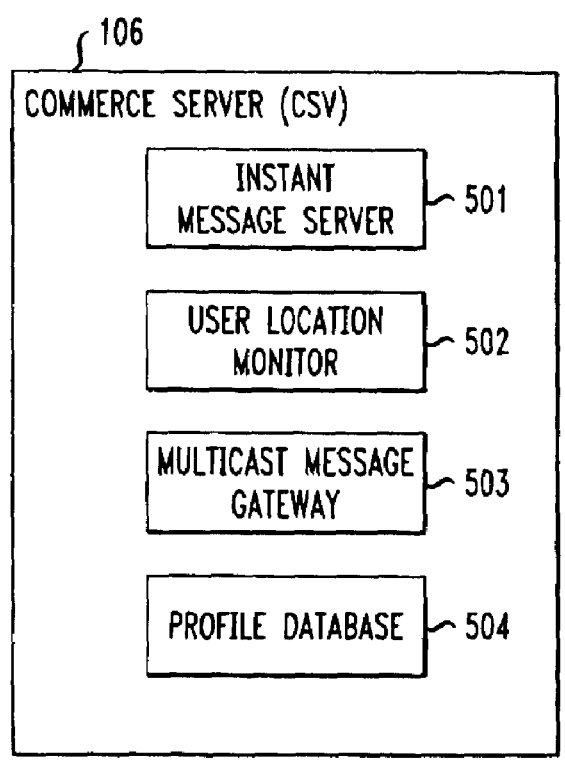

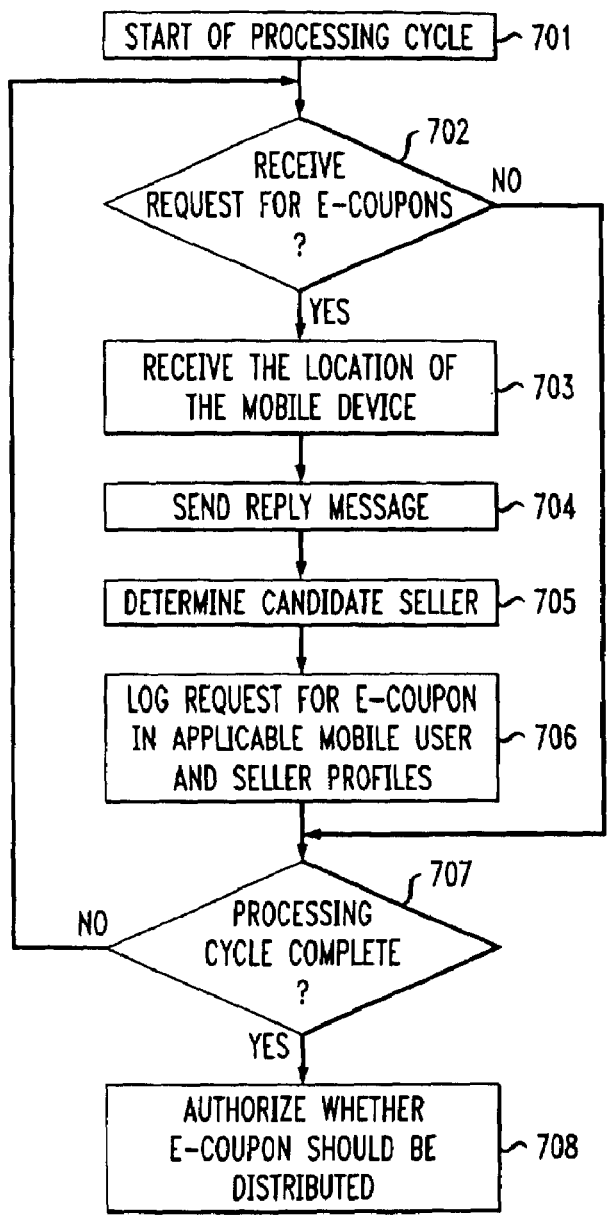

E-COUPON SERVICE FOR LOCATION-AWARE MOBILE COMMERCE WHICH DETERMINES WHETHER TO SUPPLY REQUESTED E-COUPONS BASED ON THE NUMBER OF REQUESTS RECEIVED IN A PROCESSING CYCLE, AND A THRESHOLD NUMBER OF REQUESTS REQUIRED TO MAKE EXPECTED RETURNS FROM REDEEMED COUPONS GREATER THAN ADVERTISING FEES

CROSS-REFERENCE TO RELATED APPLICATION

This application is a continuation of Ser. No. 10/002,999, filed Nov. 2, 2001, entitled E-COUPON SERVICE FOR LOCATION-AWARE MOBILE COMMERCE WHICH DETERMINES WHETHER TO SUPPLY REQUESTED E-COUPONS BASED ON THE NUMBER OF REQUESTS RECEIVED IN A PROCESSING CYCLE, AND A THRESHOLD NUMBER OF REQUESTS REQUIRED TO MAKE EXPECTED RETURNS FROM REDEEMED COUPONS GREATER THAN ADVERTISING FEES, which issued as U.S. Pat. No. 6,996,579 on Feb. 7, 2006.

FIELD OF THE INVENTION

The present invention relates to electronic coupon distribution and, more particularly, to conditional electronic coupon distribution to a mobile user.

BACKGROUND OF THE INVENTION

Today, there exist a few techniques for distribution of electronic coupons (e-coupons) to potential customers. A seller of a service or product can distribute mass email messages with e-coupons attached to or within the message. The seller then hopes that at least some of the potential customers who receive the messages will redeem the e-coupons included. Additionally, a seller can post an e-coupon on a web site, whether or not owned by the seller, and hope that a potential customer will see the e-coupon and choose to redeem it. Similar techniques exist for targeted distribution of coupons to attract potential customers who live local to a seller. For example, local restaurants or stores can attempt to attract customers on web pages local to a particular city. A city newspaper may have a website and these local sellers can post e-coupons on the site with the same hope of a customer seeing the e-coupon and choosing to redeem it.

Yet these and other techniques tend to be expensive to sellers and highly inefficient in attracting potential customers. The mass emails and e-coupon distribution carry a fixed cost based upon a hope that a potential customer exists. A seller must pay the website provider in order to put its e-coupons on the website, without any assurance at all that the e-coupons will be requested and redeemed by customers. Even existing location-aware wireless targeted advertising methods have a cost to transmit an advertisement when a mobile customer is around a particular store. A need exists to allow for distribution of an e-coupon when a desired profit margin for the seller has been statistically guaranteed.

Generally, potential customers choose a particular type of service or product and then seek to find the service or product based upon some need, whether such need is based on cost, ease of acquisition, location, or some other factor. Customer service can be enhanced if an e-coupon service were provided based upon an initial inquiry from the customer. In such an example, a seller has a substantially increased opportunity to ensure that an e-coupon is redeemed because the customer initiates the desire for the e-coupon rather than a random e-coupon being sent to a customer.

However, a seller needs additional safeguards to ensure that distributed e-coupons will be redeemed not only at a high probability, but also at an economic advantage to the seller. A seller wants to issue e-coupons so that a larger number of potential customers will redeem the e-coupons, because the seller has no economic incentive when one or a few customers actually redeem the e-coupons. Additionally, a seller needs to ensure that the distribution of e-coupons does not become economically ineffective by continually distributing e-coupons that are not redeemed.

In addition to business concerns, there are privacy concerns and technical issues often left unresolved in wireless targeted advertising and distribution systems. Privacy concerns have emerged from FCC requirements that wireless service providers must be able to identify the locations of cellular phone users making emergency calls after Oct. 1, 2001. The concern stems from the worry that wireless service providers will turn the FCC requirement into a source of profit. In particular, the wireless service providers could release the location information of mobile users to anyone wiling to pay for such information, including individuals or others who will mishandle this information.

Technical issues also exist from the standpoint of wireless service providers. In order for a participating seller to send a targeted advertisement to mobile users at a right time and in a right place, the location information of the mobile users must be accurate and monitored closely. To do so, all mobile devices must frequently send location data to the network, and thus cause significant uplink signaling traffic that may eventually overflow the network. The situation could get even worse if the location identification methods are network-based or network-assisted because they consume significant computing resources from the network.

Therefore, a need exists to allow for distribution of e-coupons to potential customers based upon an initial desire from the customer and an assurance for a seller to make extra profits in a statistical sense. Privacy concerns and technical issues also need to be addressed in order to promote location-aware mobile commerce in an optimal manner.

BRIEF SUMMARY OF THE INVENTION

The present invention provides a conditional e-coupon distribution system for a mobile network that distributes e-coupons predefined by sellers to mobile electronic devices of users only if the number of mobile users requesting such e-coupons equals or exceeds a threshold. Although the invention is primarily shown and described in conjunction with a cellular telephone network distributing e-coupons, it is understood that the invention is applicable to other network types in which it is desirable to distribute e-coupons.

In one embodiment, the invention operates in a mobile communication system based on multiple cells. The invention comprises a profile database, a profile proxy server, and a commerce server. The system receives a request to browse at least an e-coupon from a mobile user. The system receives the current location of the mobile user from the mobile user and determines a plurality of sellers local to the mobile user as well as a plurality of the corresponding e-coupons for those sellers. Upon receiving a request for a particular e-coupon from the mobile user, the invention authorizes whether the e-coupon should be distributed to the mobile user.

The invention operates according to a processing cycle. At the end of a processing cycle, the mobile user receives the requested e-coupon if all conditions, such as a period of time and threshold, have been met. Only if the threshold number of mobile users requesting a particular e-coupon has been met or exceeded is an e-coupon, from a particular seller, distributed.

The threshold value is calculated at the end of the processing cycle. The threshold value is then compared to the number of pending requests in the profile of the particular seller in question. Only upon determining that the number of pending requests is greater than or equal in value to the threshold value are the e-coupons distributed. The use of a threshold value and authorization to distribute are two examples of how the invention ensures a seller will make extra profits in a statistical sense.

The invention can improve the advertising effectiveness and cost-efficiency, because (1) e-coupons are only distributed to mobile users who explicitly request such e-coupons; (2) e-coupons for a participating seller are distributed only if the number of mobile users who requested such e-coupons equals or exceeds a threshold; (3) a participating seller is assured to make extra profit in a statistical sense by adopting the threshold value calculated by the conditional e-coupon service provider; and (4) a participating seller is charged an advertising fee by the conditional e-coupon service provider only after its e-coupon are distributed.

A feature that differentiates the conditional e-coupon service from conventional advertising methods is that the conditional e-coupon service neither pushes advertisement messages to mobile users nor does it arbitrarily send (costly) advertisements. Once a seller is advertised using the conditional e-coupon service, the threshold value assures a sufficiently large mobile user base from which a seller can make a profit in a statistical sense after paying an advertising fee to the conditional e-coupon service provider.

The conditional e-coupon service concept also includes a quota system that strikes a good balance between giving mobile users sufficient freedom not to redeem received e-coupons for whatsoever reasons and preventing irresponsible mobile users from sending a large volume of e-coupon requests when the mobile users have no intention to redeem any of the received e-coupons.

In addition, the present invention can eliminate the technical problem for wireless targeted advertising because it is operated based on requests made by mobile users. The accurate location information of mobile users is conveniently imbedded in these requests, and therefore mobile users do not need to send periodical location update messages to wireless networks. The invention also eliminates any privacy concerns, because it does not need to track the location of mobile users and it only supplies participating sellers with statistical information of a group of mobile users (such as how many mobile users have requested e-coupons from the seller) instead of information of individual mobile users.

In view of the present invention, it can be seen qualitatively that a conditional e-coupon service expects to receive welcome from all involved parties. Mobile users save money right before they go shopping. The invention is particularly useful to a group of mobile users planning to visit the same seller. Participating sellers find the conditional e-coupon service a cost-efficient targeted e-coupon distribution scheme, because e-coupons are distributed to mobile users only if e-coupons can bring enough estimated redeems that can make extra profits for the seller. The conditional e-coupon service provider can earn advertising fees from the participating sellers. Finally, the wireless service providers may find they can expand customer base by associating with the conditional e-coupon service provider because both mobile users and participating sellers need wireless data services to utilize the distribution service.

BRIEF DESCRIPTION OF THE DRAWINGS

FIG. 5 is a block diagram of an exemplary commerce server that can form a part of a conditional e-coupon distribution system in accordance with the present invention.

FIG. 7 shows an exemplary sequence of steps for responding to an e-coupon request in a conditional e-coupon distribution system in accordance with the present invention based upon a processing cycle.

DETAILED DESCRIPTION OF THE INVENTION

Figure 1:
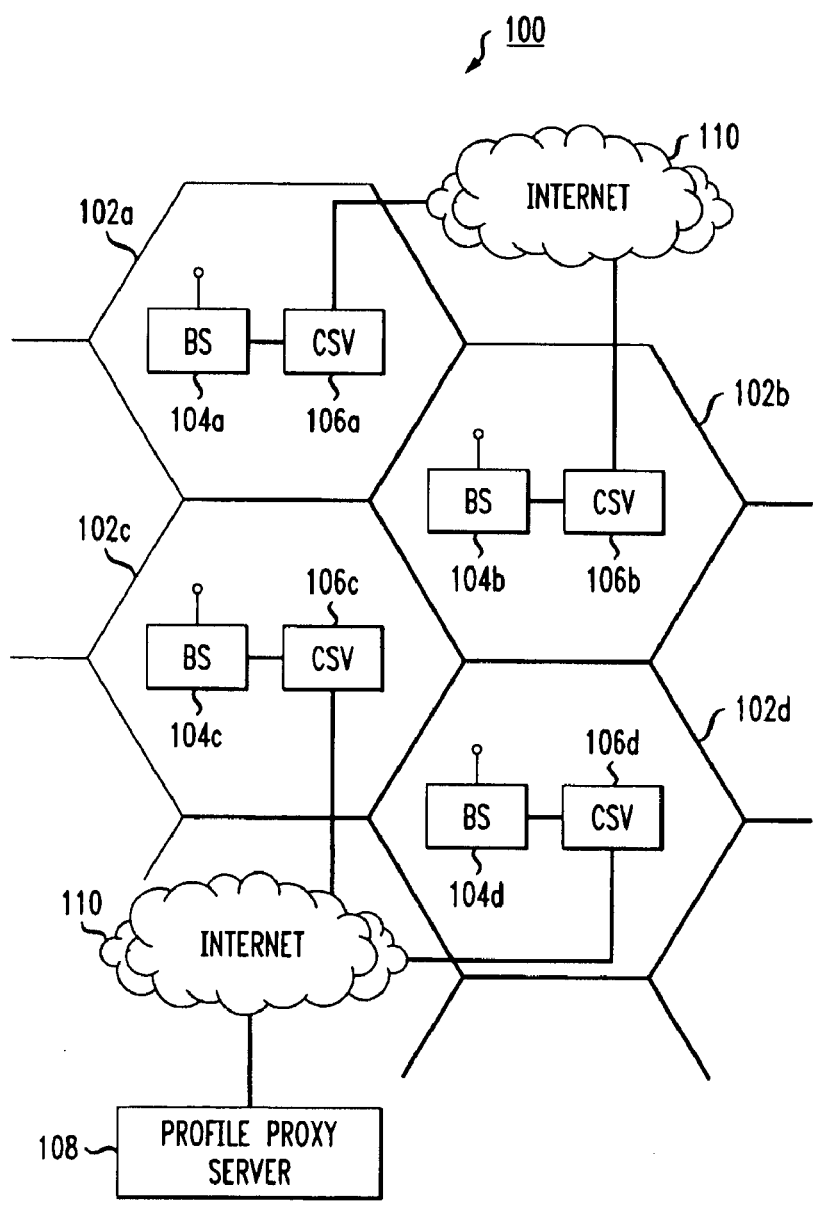
FIG. 1 is a schematic diagram of an exemplary conditional e-coupon distribution system in accordance with the present invention.
Figure 2:
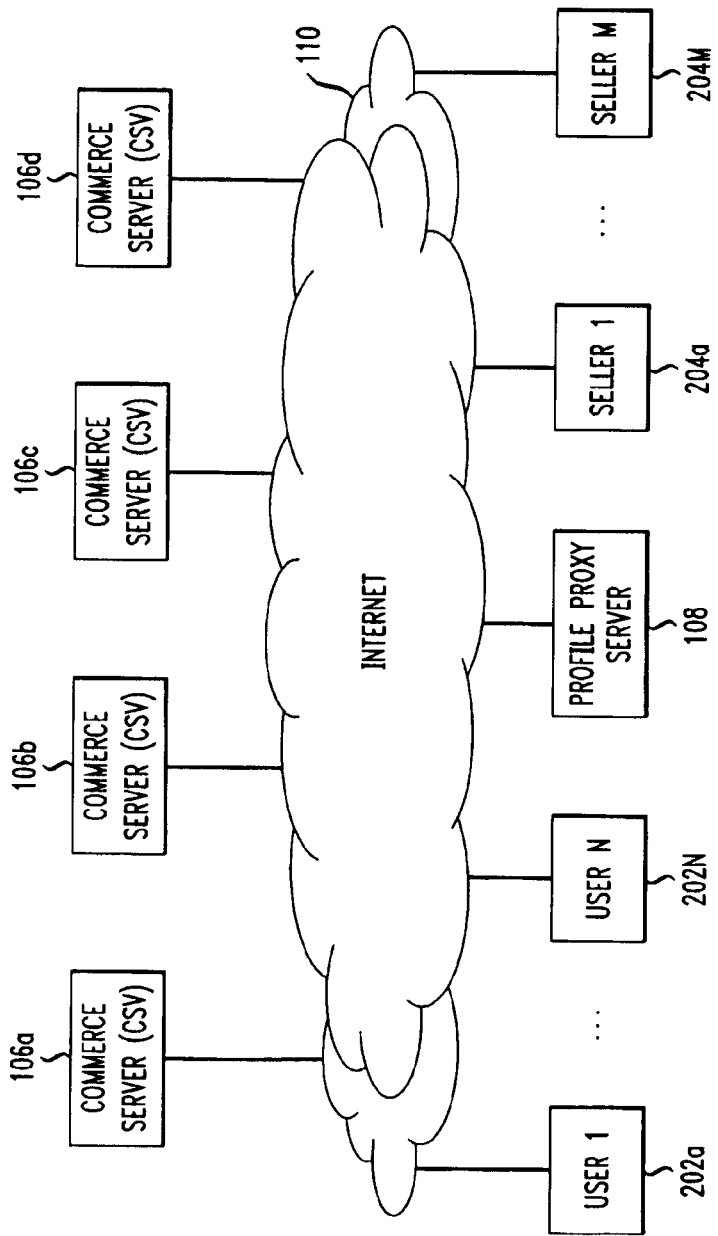
FIG. 2 is a further schematic diagram of an exemplary conditional e-coupon distribution system in accordance with the present invention.

FIGS. 1 and 2 show a wireless mobile communication system 100 having conditional e-coupon distribution in accordance with the present invention. In general, the system sends e-coupons to mobile users based upon user location and conditions specified by users and sellers. This arrangement provides an efficient mechanism for suppliers of goods and services, i.e., sellers, to distribute e-coupons to mobile users who wish to receive an e-coupon from a particular seller.

In one embodiment, the mobile communication system 100 includes a plurality of cells 102a-d each served by a respective base station 104a-d in a manner well known to one of ordinary skill in the art. Each of the base stations 104a-d can be coupled to a respective commerce server 106a-d for providing messaging instructions to the base station as described in detail below. The commerce server 106 can be connected to a profile proxy server (PPS) 108 via a network 110, such as the Internet or intranet. A plurality of mobile users 202a-N and sellers 204a-M (FIG. 2) can communicate with the profile proxy server 108 via the Internet 110, for example. The profile proxy server 108 can send the provided information to a commerce server 106 that is local to the mobile user for storage in a database.

Figure 3:
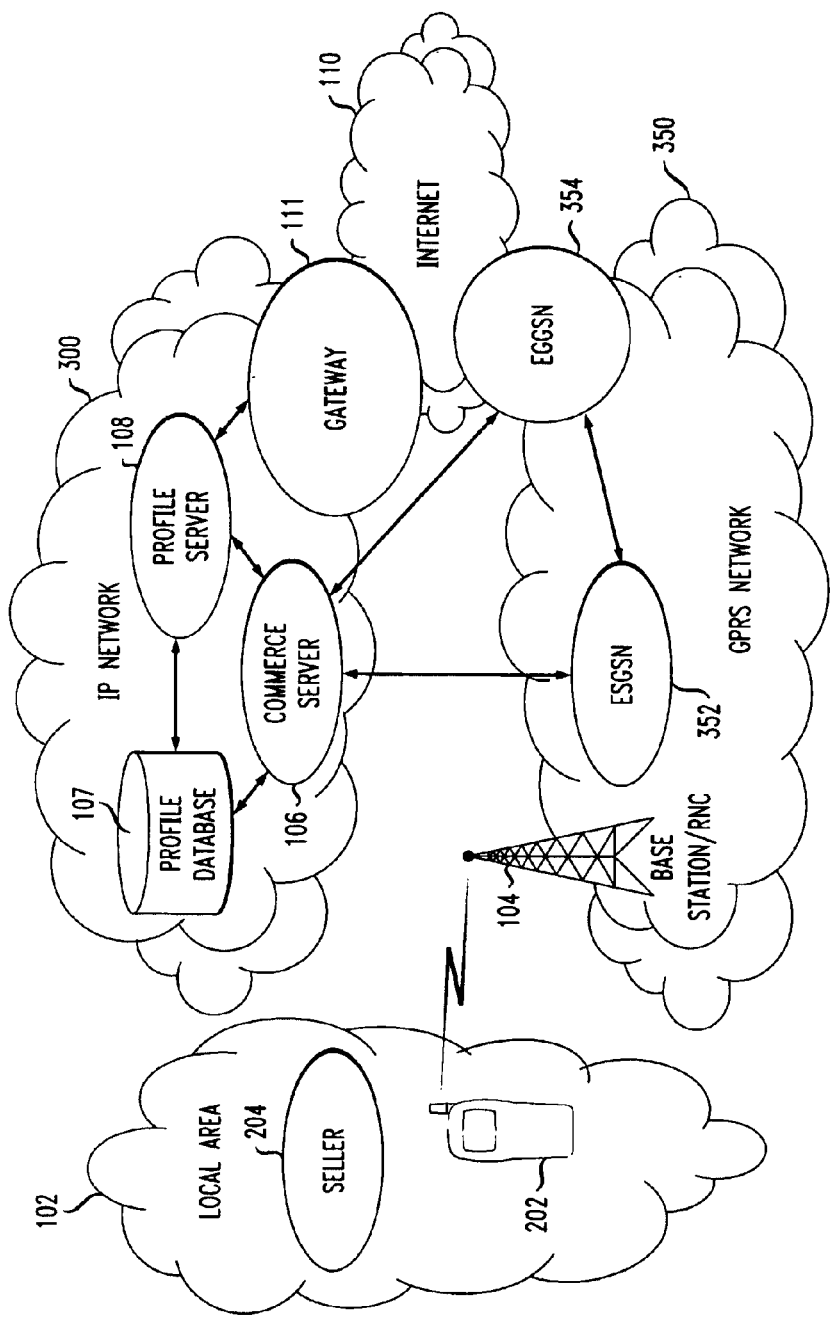
FIG. 3 is a schematic diagram of a particular embodiment of a conditional e-coupon distribution system in accordance with the present invention.

FIG. 3 shows one particular embodiment of a conditional e-coupon distribution system 300 in accordance with the present invention that can be coupled to a General Packet Radio Service (GPRS) network 350. The conditional e-coupon distribution system 300 includes a profile proxy server 108 coupled to a commerce server 106 and to a profile database 107, which is also coupled to the commerce server 106. As described below, the profile database 107 can store profile data for mobile users and sellers associated with the mobile network. The profile proxy server 108 is coupled to the Internet 110 via a conventional gateway 111. In one embodiment, one profile proxy server 108 can support a plurality of commerce servers 106 throughout the conditional e-coupon distribution system. Further, the profile database 107 could comprise multiple databases for storage of data profiles of mobile users and sellers.

The GPRS network 350 includes a Serving GPRS Support Node (SGSN) 352 coupled to a local commerce server 106 and to a Gateway GPRS Support Node (GGSN) 354. The SGSN 352 communicates with a base station 104 covering the local cell 102 for providing mobile service to users 202 within the cell. The commerce server 106 provides e-coupon information to the local SGSN 352 for transmission by the associated base station 104.

Figure 4:
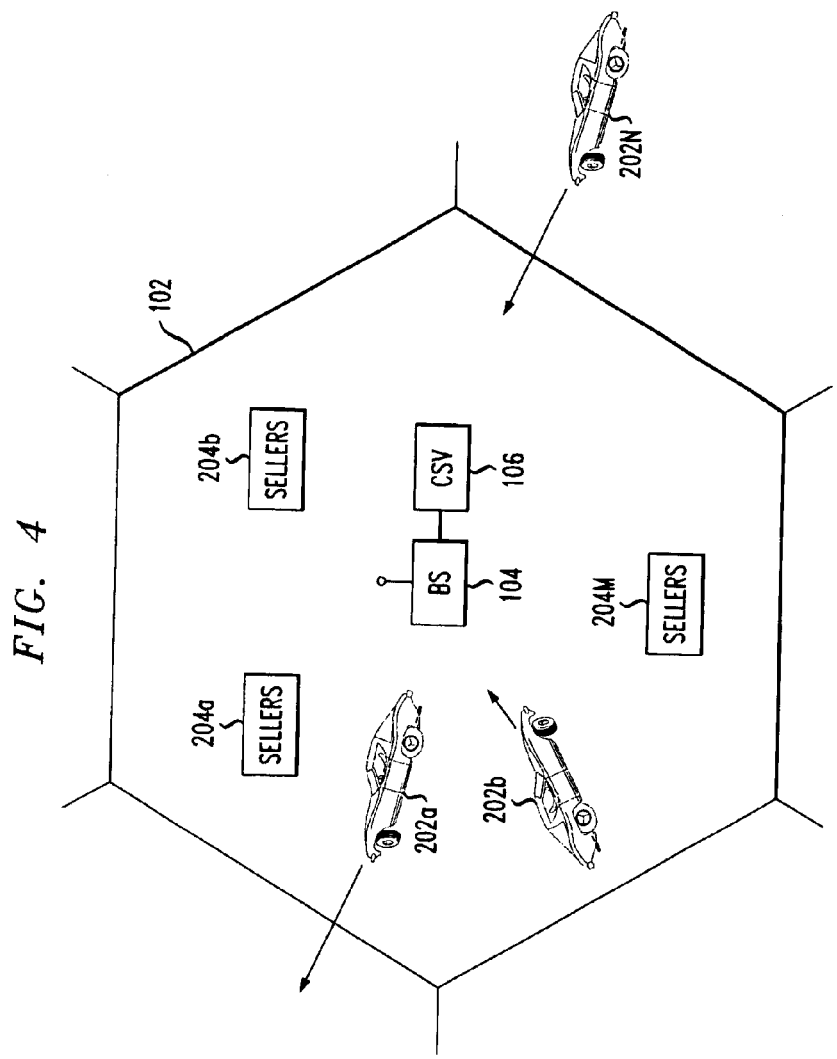
FIG. 4 is a pictorial representation of a particular embodiment of a conditional e-coupon distribution system in accordance with the present invention showing user movement.

As shown in FIG. 4, mobile users 202*a*-N move within, into, and out of different cells 102 within the network. Sellers 204*a*-M want to contact potential users 202 that have expressed a desire for their type of goods or services. In general, sellers 204 wish to identify users proximate their location to maximize the likelihood that a user will visit the seller. As described below, the conditional e-coupon distribution system of the present invention can transmit e-coupons that are requested by users 202 proximate a particular seller 204 provided that the profile conditions, e.g., type of goods, threshold, time, location, are met by the request. The e-coupon identifies the seller and allows the mobile user to locate and/or contact the seller. Sellers specify conditions, e.g., range, time, number of mobile users, under which the e-coupons are distributed, as described below.

As described above in connection with FIGS. 1-3, mobile users 202 provide profile information to a local commerce server 106 under the control of the profile proxy server 108. In one embodiment, the mobile user 202 can provide profile information via the Internet 110 to maximize user convenience. The profile proxy server 108 ensures that the mobile user profile information is stored in a profile database 107 associated with a commerce server 106 that is local to the mobile user's base location, e.g., home address. As described in detail below, the base station 104 covering the mobile user's current location transmits e-coupon information that is received by mobile users.

In general, sellers specify conditions for distributing e-coupons. Exemplary conditions include distributing their e-coupons only when a predetermined number of mobile users have requested an e-coupon of the seller, at certain times of the day, and certain days of the week. In addition, the seller profile can contain driving directions to the seller and other e-coupons available from the seller. The seller profile can further include periods of time desired for e-coupon distribution, mobile user distance range, and type of e-coupon. The seller conditions can be stored in a seller profile database associated with a commerce server local to the seller.

In one embodiment, a seller can manually determine the number of mobile users within the seller's local area that have requested the seller's e-coupon by connecting to the proxy server. For example, a seller can communicate with a local commerce server that provides mobile user information to the seller. The seller can then manually distribute e-coupons to mobile users who have requested the seller's e-coupon. In this example, a seller has the option to allow the e-coupons to be distributed to users who have requested the e-coupon although seller conditions, such as time of day, range, etc., have not been satisfied. Thus the seller can distribute the e-coupons without identifying a particular mobile user. Therefore, user privacy can be maintained by protecting the actual identity of the mobile user.

FIG. 5 shows an exemplary embodiment of a commerce server, such as the commerce server 106 of FIGS. 1 and 2, that forms part of a conditional e-coupon distribution system in accordance with the present invention. In one embodiment, the commerce server 106 includes an instant message server 501 for generating instant messages to a mobile user in response to an active request for information from a mobile user. The instant message server 501 can also include the mobile user in a group of mobile users to receive e-coupons in response to an inquiry.

The commerce server 106 can further include a mobile user location monitor 502 for monitoring the location of mobile network users. As described more fully below, the mobile user's location can be used to distribute e-coupons requested by the mobile user. A multicast message gateway 503 delivers e-coupons to a selected group of mobile users via a GPRS network in a multicast format. Alternatively, the e-coupons can be distributed using conventional Short Message Service (SMS) or Cellular Digital Packet Data (CDPD) email services.

The commerce server 106 can further include a profile database 504 for storing mobile user and seller profiles. Mobile users and sellers can modify their profile information via the profile proxy server 108 through the Internet 110.

In one embodiment, the mobile user and seller profiles are stored on the commerce server 106 that is local to the respective mobile user or seller. The profile proxy server 108 can contain a user-message server index. With this arrangement, in the case where a mobile user is not within the area served by the commerce server containing the mobile user's profile, the profile proxy server can be queried by the commerce server in which the mobile user is currently located to obtain the mobile user's profile, as described more fully below.

Figure 6A:
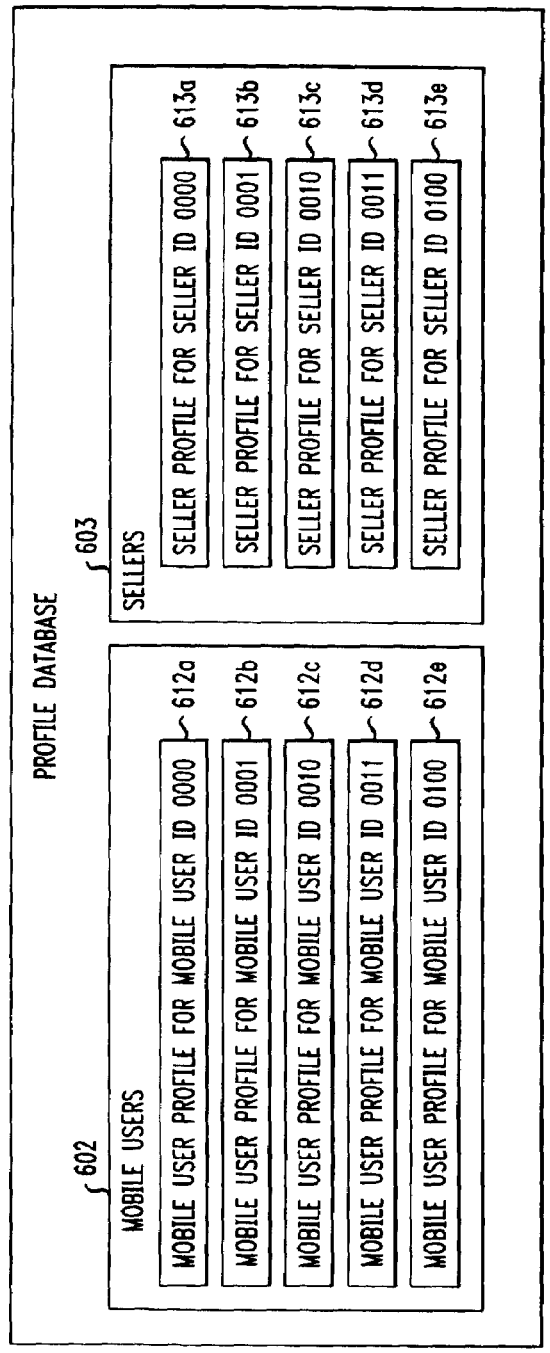
FIG. 6A is a block diagram of an exemplary profile database that can form part of a conditional e-coupon distribution system in accordance with the present invention.

Referring to FIG. 6A, a block diagram is shown depicting an exemplary profile database, such as the profile database 107 of FIG. 3 that forms part of a conditional e-coupon distribution system in accordance with the present invention. In one embodiment, the profile database 107 includes first, 602, and second, 603, tables that store all mobile user profiles 612*a-e* and all seller profiles 613*a-e* respectively. The tables are indexed by a mobile user identification and a seller identification respectively.

Figure 6B:
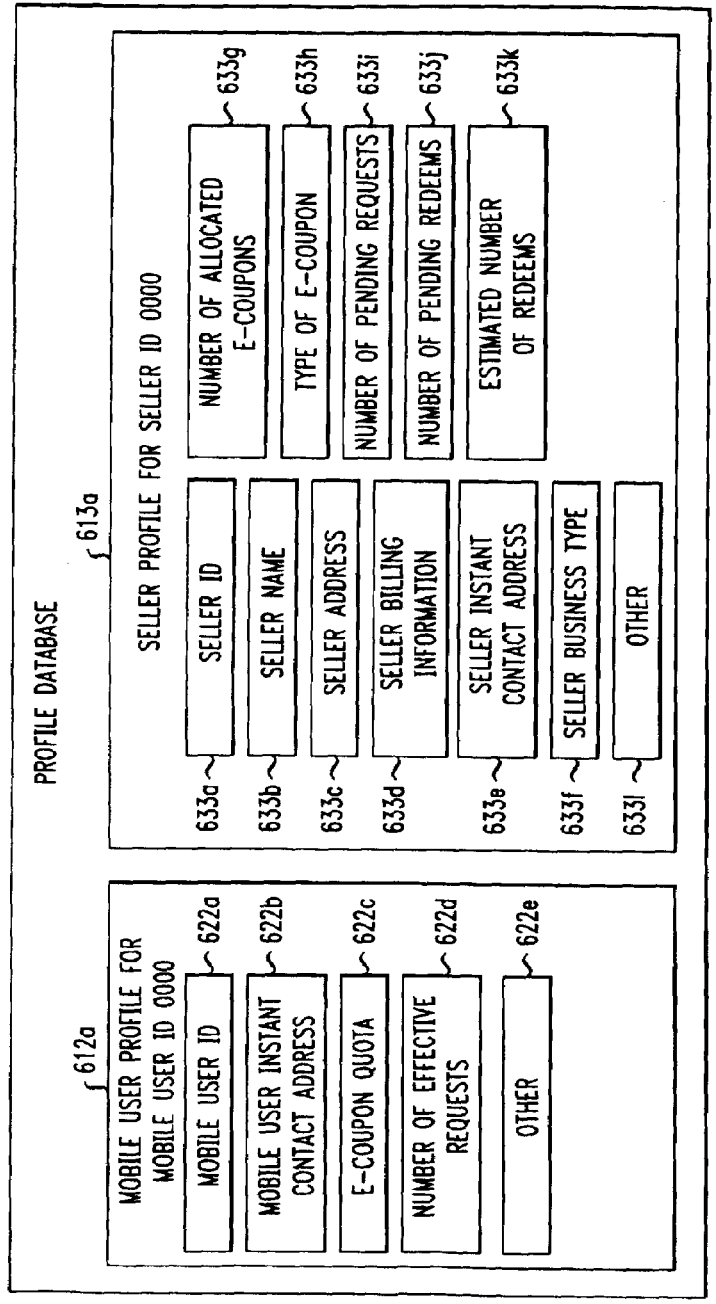
FIG. 6B is a further block diagram of an exemplary profile database that can form part of a conditional e-coupon distribution system in accordance with the present invention.

Referring to FIG. 6B, a block diagram is shown depicting an exemplary profile database, such as the profile database 107 of FIG. 3, further defining information found within a particular mobile user profile 612*a*, and seller profile 613*a*. In one embodiment, the mobile user profile 612*a* includes: a mobile user identification field 622*a*; a mobile user instant contact address field 622*b*; an e-coupon quota field 622*c*; and a number of effective requests field 622*d*. Other fields 622*e* could include information such as a percentage of e-coupon redemptions for the mobile user, a password for changing account information, an option to allow for automatic notification of e-coupons from a particular seller when the mobile user is local to the seller, and a listing of past purchases using the conditional e-coupon distribution service.

The mobile user instant contact address field 622b could comprise a mobile phone number, a Short Message Service (SMS) address, an instant message address, an email address, or a mobile email address belonging to a mobile phone or other mobile device capable of supplying location information.

The e-coupon quota field 622c comprises the number of e-coupons the mobile user can possibly receive during a quota reset cycle, a predefined period of time. At the first time when a mobile user uses the conditional e-coupon system or at the beginning of a quota reset cycle, i.e., week, month, a value is assigned to the e-coupon quota field 622c in the mobile user profile 612a. After the mobile user requests an e-coupon, the e-coupon quota field is decreased by a value of one in the profile of the mobile user. Should the mobile user not receive the desired e-coupon, or if the mobile user receives the e-coupon and redeems it, the e-coupon quota field is increased by a value of one.

If the e-coupon field reaches a value equal to zero, the mobile user cannot request any e-coupons, from any seller, until the next quota reset cycle, i.e., next week, month. This safeguard is introduced in the profile of the mobile user to prevent an irresponsible mobile user from abusing the conditional e-coupon service, because a fundamental assumption for the conditional e-coupon service is that a mobile user will redeem at least one of the e-coupons received upon a request at a very high probability. The e-coupon quota field 622c allows for mobile user freedom in obtaining a number of e-coupons at any one time, rewarding mobile users that redeem e-coupons, and protection of the interests of sellers.

The number of effective requests field 622d is the number of requests that result in receiving e-coupons. At the end of every quota reset cycle, an e-coupon effectiveness ratio for every customer can be estimated from the remaining quotas and the number of effective requests. This e-coupon effectiveness ratio is used to optimize the conditional e-coupon service operation and is described below.

In one embodiment, the seller profile 613a includes: a seller identification field 633a; a seller name field 633b; a seller address field 633c; a seller billing information field 633d; a seller instant contact address field 633e, a seller business type field 633f; a number of allocated e-coupon field 633g; a type of e-coupon field 633h; a number of pending requests field 633i; a number of pending redeems field 633j, and an estimated number of redeems field 633k. Other fields 633l could include information such as driving directions to the seller, a password for changing account information, and a percentage of e-coupon redemptions.

The seller instant contact address field 633e could comprise a phone number, an instant message address, an email address, or any other method by which the seller can be notified that an e-coupon of the seller has been distributed. The seller business type field 633f is described by a set of keywords, which can be used in the case where a mobile user enters a keyword instead of a seller name to request e-coupons.

In the seller profile, the seller also needs to predefine one or more e-coupons. Every e-coupon is associated with some conditions, including time (when e-coupons can be distributed), range (where e-coupons should be distributed), and a pre-advertising profit margin (how much profit the seller can make from a mobile user redeeming the e-coupon). If multiple e-coupons are predefined, only one e-coupon is ready to be issued at a given time. That is, the time conditions are exclusively against each other. A type of e-coupon field 633h could comprise the time condition, the range condition, and the profit margin condition defined above.

The time condition for an e-coupon can be a scheduled period that remains the same throughout a defined period. For example, the time condition could be a five-minute processing cycle that operates consecutively, that is every five minutes. Alternatively, the time condition could be a five-minute processing cycle that only occurs between noon and midnight. Processing cycle times and windows for distribution can vary and are not limited by the examples used herein.

The range condition for an e-coupon defines the boundaries for distribution. For example, the range may be any mobile user requesting the e-coupon that is within the same cell as the seller. Alternatively, the range may be within five miles of the seller. Finally, the pre-advertising profit margin is a parameter from which the conditional e-coupon system can calculate a threshold value for the seller and therefore can determine whether the e-coupon of the seller should be distributed to the mobile users who requested the e-coupon within the preceding processing cycle. The pre-advertising profit margin is the difference between the price and the cost of the service/goods promoted in the e-coupon.

FIG. 7, in combination with FIGS. 1-3, shows an exemplary sequence of steps for responding to an e-coupon request in a conditional e-coupon distribution system in accordance with the present invention. In general, a local commerce server receives a request for e-coupons, and upon receiving the request, the system authorizes whether the e-coupon should be distributed. A processing cycle begins in step 701. In step 702, it is determined whether the system has received a request for e-coupons. Such a request could be defined by keywords, such as "grocery store" or "fast food." Alternatively, the request could be to browse for all e-coupons for a particular seller by the seller name. For this example, assume that the mobile user enters "fast food within one mile." If the system receives a request, the location of the mobile device is received with the request in step 703. The methods for determining the location of a mobile device are well known in the art. An exemplary embodiment entails the local commerce server receiving the current location of the mobile user in connection with the request to browse because the mobile electronic device automatically inserts the location data as a header parameter in the outgoing request to browse message.

After receiving the request for e-coupons, the conditional e-coupon profile proxy server, in step 704, immediately sends a reply message back to the mobile user, which shows, for example, the remaining quota and estimated time to receive e-coupons (it is possible that the mobile user may not receive any e-coupons). The conditional e-coupon profile proxy server then passes the request message to the condition e-coupon commerce server, along with the request time, the location of the mobile user, and the instant contact address of the mobile user.

Consequently, the commerce server looks within the profile database for all sellers that have "fast food" in their service/goods descriptions. As in step 705, once a match is found, the commerce server first checks the timing and range conditions set by the seller. If these conditions permit e-coupon distribution, the commerce server then compares the seller location with the mobile user location and determines if the "one mile" requirement can be satisfied. If this requirement is satisfied, the seller is declared as a candidate seller for the request, and the request is logged as a pending request to the seller. After all the candidate sellers are identified, a redeem probability, which equals the e-coupon effectiveness ratio for the mobile user divided by the number of candidate sellers, is assigned to every pending request. The e-coupon effectiveness ratio is estimated from statistics collected in the previous quota reset cycle in the mobile user profile. The reason why the number of candidate sellers serve as a denominator in the redeem probability is that all candidate sellers are competitors against each other and, thus, if all candidate sellers decide to issue their e-coupons, the mobile user will probably redeem only one of them. Note that the commerce server does not immediately decide whether e-coupons should be distributed. Instead, it makes such decision at the end of the processing cycle, which could be about 5 to 10 minutes. Before a processing cycle ends, the commerce server simply logs 706 every incoming request as described above.

In step 707, a determination is made as to whether a processing cycle is complete. After a processing cycle is finished, in step 708, the commerce server authorizes whether the e-coupon should be distributed. The commerce server checks every candidate seller profile and distributes e-coupons for a seller if there are enough pending requests in the seller profile. This process consists of the following three steps.

(1) The commerce server estimates the overall e-coupon effectiveness ratio, denoted as r, for every candidate seller using the following formula:

$$r = \frac{1}{N}\sum_{n=1}^{N}\frac{r_n}{c_n}$$

where N is the number of pending requests and $$\frac{r_n}{c_n}$$

is the redeem probability for the $n^{th}$ pending request to the candidate seller. That is, $r_n$ is the e-coupon effectiveness ratio for the mobile user whose request is the $n^{th}$ pending request to the candidate seller, and $c_n$ is the number of candidate sellers for this request.

(2) The commerce server calculates the best initial threshold θ (explained in next section) based on the pre-advertising profit margin, the overall e-coupon effectiveness ratio, and the advertising fee for every candidate seller, which statistically guarantees every candidate seller to make maximum profit. If $N \geq θ$, which means the number of pending requests equals or exceeds the initial threshold, the commerce server distributes e-coupons using SMS to every mobile user who has a pending request in the candidate seller profile.

(3) The commerce server has all sellers with N<θ go through an optimal consolidation process (explained in next section). The objective hereby is to maximize the number of candidate sellers that can finally distribute e-coupons by selectively removing candidate sellers (thus the e-coupon effectiveness ratio for remaining candidate sellers can be improved due to less competition and hence their initial thresholds can be reduced to a new optimal threshold). This ensures that the conditional e-coupon service provider can make maximum revenue and a maximum number of e-coupon requests from mobile users can be satisfied.

Once it is determined that an e-coupon is to be distributed, the commerce server generates a serial number as well as a redeem confirmation number for the e-coupon. THe e-coupon is then distributed with the serial number included to all mobile users who requested it, and a notification message that includes the serial number and redeem confirmation number is sent to the corresponding candidate seller via the seller instant contact address.

After receiving the desired e-coupons, a mobile user can go to the issuing candidate seller and redeem the e-coupon. The mobile user has various methods to confirm she has redeemed the e-coupon in order to get back her quota. One method is to request a redeem confirmation number from the candidate seller for a sale/visit, which is reported back to the profile proxy server by the mobile user. Another method is to contact the profile proxy server using the mobile user's wireless device when she is physically in the issuing candidate seller's store. In this case, the seller location is automatically submitted to the profile proxy server, which serves as the evidence that the mobile user was attracted to the candidate seller by the e-coupon. The quota system discussed earlier provides an incentive to the mobile user to report back. There can also be other methods to provide an incentive for such reporting, such as the provision of discounts or bonus points.

Figure 8:
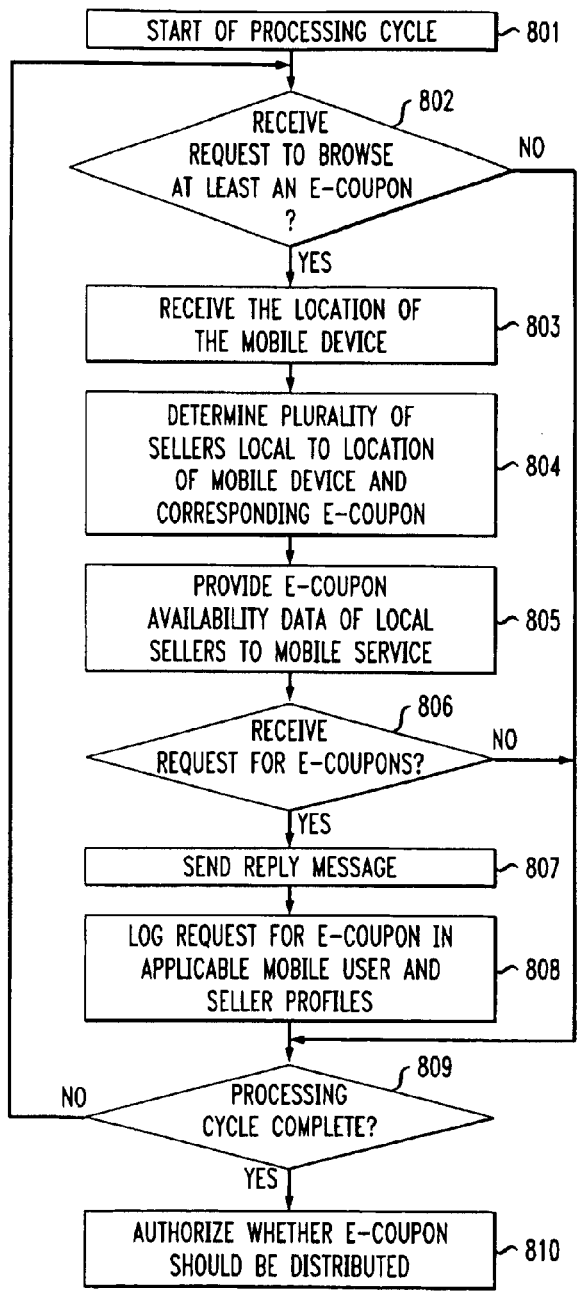
FIG. 8 shows another exemplary sequence of steps for responding to an e-coupon request in a conditional e-coupon distribution system in accordance with the present invention based upon a processing cycle.

FIG. 8 shows an alternative embodiment. A local commerce server receives a request to browse at least an e-coupon, and upon receiving a request for a particular e-coupon, the system authorizes whether the e-coupon should be distributed. A processing cycle begins in step 801. In step 802, it is determined whether the system has received a request to browse at least an e-coupon. If the system receives a request, the location of the mobile device is received with the request in step 803. An exemplary embodiment entails the local commerce server receiving the current location of the mobile user in connection with the request to browse because the mobile electronic device automatically inserts the location data as a header parameter in the outgoing request to browse message. In step 804, a plurality of sellers local to the location of the mobile user and meeting the request criteria, such as for "grocery" or a particular seller, is determined. In addition, a plurality of the corresponding e-coupons available for each seller is determined. The e-coupon availability data is subsequently provided to the mobile user in step 805.

In step 806, it is determined whether the system has received a request for a particular e-coupon from the set of e-coupons provided in step 805. If the request for a particular e-coupon is received in 806, the conditional e-coupon profile proxy server, in step 807, immediately sends a response message back to the mobile user, which shows the remaining quota and estimated time to receive e-coupons (it is possible that the mobile user may not receive any e-coupons). The conditional e-coupon profile proxy server then passes the request message to the conditional e-coupon commerce server, along the request time, the location of the mobile user, and the instant contact address of the mobile user. In step 808, the request for the e-coupon is logged within the applicable mobile user and seller profiles. A log of this request is created because the system does not authorize distribution of e-coupons until the end of the processing cycle. Such a processing cycle could last for any predetermined amount of time and could vary among sellers, particular types of e-coupons, or even among varying e-coupons of a same seller.

In one embodiment, in step 808, to log a request received from a mobile device, the conditional e-coupon system creates a record in the profile of the mobile user, which contains the request time and the IDs of all the sellers requested. Next, the system will decrease the e-coupon quota field 622c in the mobile user profile. THe system then creates a record in the profile of every seller, which contains the request time and the ID of the mobile user. Finally, the system increases the estimated number of redeems field 633k. The value of the increment could be chosen to equal one divided by the number of sellers in the request. Therefore, if a mobile user requested a particular e-coupon from a particular seller name and if there were two stores of the seller name local to the location of the mobile user, the estimated number of redeems field 633$k$ would be increased by 0.5 or one divided by two sellers in the request.

In step 809, the system determines whether the processing cycle has been completed. If the processing cycle has not been completed, the system again returns to step 802 and determines whether a request to browse at least an e-coupon has been received. However, if the processing cycle has been completed, the system authorizes whether the e-coupon should be distributed 810.

Figure 9:
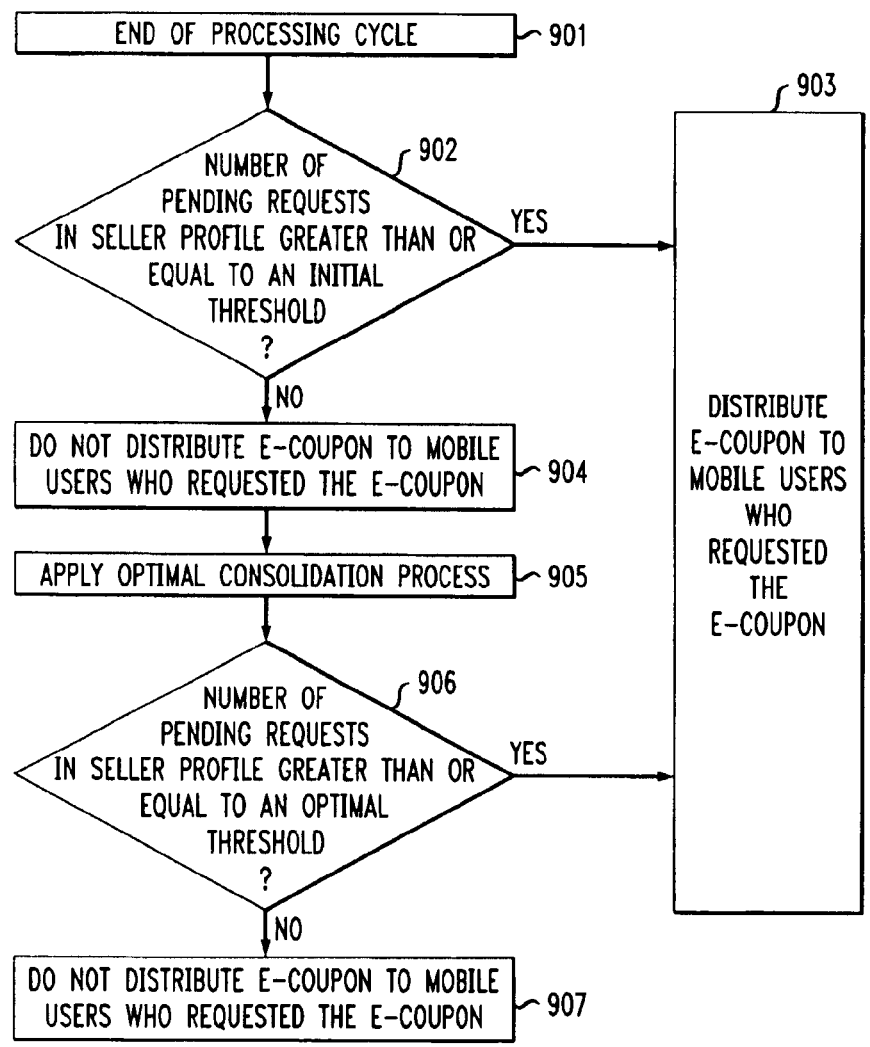
FIG. 9 shows further an exemplary sequence of steps for authorizing whether an e-coupon should be distributed in accordance with the present invention.

FIG. 9 shows the steps for the system to authorize whether an e-coupon should be distributed and subsequent action by the system. In step 901, the processing cycle has ended. In one example, moving to step 902, the system determines whether the number of pending requests in the seller profile is greater than or equal to an initial threshold value. As disclosed above, the initial threshold value is calculated at the end of the processing cycle.

One method of calculation of the initial threshold is to divide an advertising fee for the e-coupon by a product of the estimated number of redeems field 633$k$ in the seller profile times a pre-advertising profit margin for the e-coupon. The initial threshold value is then compared to the number of pending requests 633$i$ in the profile of the particular seller in question, as shown in step 902, to authorize whether the e-coupon should be distributed.

Only upon determining that the number of pending requests is greater than or equal in value to the initial threshold value do the e-coupons get distributed, as shown in step 903, to mobile users who requested the e-coupon in the preceding processing cycle. If the system determines that the number of pending requests in the seller profile is less than the initial threshold value, the e-coupons are not distributed as shown in step 904. Subsequent to step 903 or 904, the system could send a message to the mobile user to inform the mobile user that the e-coupon could not be distributed or the system could provide other options.

In another embodiment, in step 905, an optimal consolidation process is applied to the sellers whose e-coupons are not distributed in step 904. The optimal consolidation process is discussed below. Then the system determines whether the number of pending requests is greater than or equal in value to an optimal threshold value as shown in step 906. If the number of pending requests is greater than or equal to the optimal threshold, the e-coupon is distributed to the mobile user as shown in step 903. However, if the number of pending requests is less than the optimal threshold, the e-coupon is not distributed as shown in step 907. The optimal threshold is calculated in the same manner, but only after the optimal consolidation process, discussed below, is applied.

The essence of the conditional e-coupon service is to let the conditional e-coupon service provider automatically negotiate a "wholesale" deal for a group of mobile users, who may not know each other, with a seller provided that the seller can make profit from this "wholesale" transaction. The conditional e-coupon service provider charges a commission (the advertising fee) from the seller once a "wholesale" deal is offered (i.e., e-coupons are distributed).

Conventional coupon distribution is a special case for the conditional e-coupon service. If a seller wants e-coupons to be distributed unconditionally, the seller could simply set the pre-advertising profit margin to be infinity.

The following sections only discuss conceptually how the e-coupons are distributed, and how the e-coupon distribution notification messages are sent to sellers. A significant cost as well as high effectiveness for wireless advertising is expected. The conditional e-coupon service provider has to collect advertising fees for every e-coupon distribution, because it is very difficult to identify if the deal is made solely due to the e-coupon. By contrast, it is relatively easy for a seller to verify that some extra traffic is indeed brought in by e-coupons. E-coupon distribution may be mapped to the cell broadcasting operation in GSM networks that support cell broadcast short message service. It may also be carried out using point-to-point short message service. If the former method is used, the distribution cost is independent of the number of mobile users. In this case, the conditional e-coupon service provider may charge a flat advertising price for each distribution. If the latter method is used, the conditional e-coupon service provider may have to adopt an advertising price that increases as the number of mobile users increases.

Now an optional consolidation process will be discussed from a mathematical model to proposed implementation. The following models and calculations quantitatively demonstrate that the conditional e-coupon service can be optimized for all involved parties—sellers can make maximum profit by adopting the best threshold values, the conditional e-coupon service provider can make maximum revenue, and mobile users can receive a maximum number of e-coupons (by running an optimal consolidation process in the conditional e-coupon system.)

Mathematical Model

One mathematical model for calculation of a threshold is described herein. A conditional e-coupon service provider will charge an advertising price p against a seller each time an e-coupon for the seller is distributed. Three typical advertising price plans will be analyzed below. They are (a) a flat advertising price plan (p is independent of N, which is also the number of mobile users who will receive e-coupons if e-coupons are distributed), (b) a proportional advertising price plan (p is proportional to N), and (c) a linear advertising price plan (a combination of a flat and a proportional advertising fee), p is denoted as p(N).

There are N(t) pending requests at the seller during a processing cycle [t, t+T), where N(t) is a random process defined on $\{0, Z^+\}$ and T is the length of a processing cycle, such as 5 minutes or 10 minutes. It should be noted that N(t) might not necessarily be stationary. Nonetheless, N(t) will be denoted as N hereafter for this example, since it will be shown that the best threshold is independent of the statistical distribution function of N(t).

The goods or service offered by the seller to one mobile user has a pre-advertising profit margin m, which is the difference of the offering price minus the cost (excluding the advertising price p). m is fixed in every processing cycle.

The estimated number of redeems is denoted as M. This number is not used directly in the calculation. Instead, a new notation r called the e-coupon effectiveness ratio, which is equal to M/N, is introduced. The effectiveness ratio r essentially is a random variable. It should be noted that r might vary significantly from one processing cycle to another, because it is dependent of N and many competition factors that are subject to large fluctuations.

A threshold $\theta$ is defined with regard to the number of pending requests N. That is, if $N \geq \theta$, the conditional e-coupon commerce server should distribute the e-coupon to the N mobile users who sent in pending requests for the e-coupon.

The reason the threshold θ is not defined with regard to the estimated number of redeems M is because N could be modeled by a Poisson distribution, while modeling M is more difficult.

The extra revenue that the conditional e-coupon service can generate for the seller during a processing cycle is a function of the threshold θ, $$f(\theta) = mrNu(N-\theta)$$

where, u(x) is the step function, $$u(x) = \begin{cases} 1 & \text{for } x \geq 0 \\ 0 & \text{for } x < 0 \end{cases}$$

The advertising cost that is charged by the conditional e-coupon service provider for distributing an e-coupon in a processing cycle is also a function of the threshold θ, $$c(\theta) = p(N)u(N-\theta)$$

The expectation of the extra profit that the seller can make from the conditional e-coupon service in a processing cycle is given by, $$P(\theta) = E(f(\theta) - c(\theta)) = \sum_{n=\theta}^{\infty} (mrn - p(n))Pr(N = n)$$

where, Pr(N=n) is the probability of N=n. It is assumed that Pr(N=n)<0 for any n.

The objective for a seller is to find the best threshold θ such that the seller can maximize the expectation of the extra profit from the conditional e-coupon service. This is equivalent to maximizing the expectation of the extra conditional e-coupon profit in any processing cycle. That is, Max{P(θ)}.

The seller does not solve the maximization problem alone, because the effective ratio r varies in every processing cycle. Alternatively, the seller only gives the pre-advertising profit margin m in its seller profile, from which the conditional e-coupon controller determines the best threshold and authorizes distribution for the seller accordingly.

The objective for the conditional e-coupon service provider is to find the best advertising price p such that the conditional e-coupon service provider can maximize the conditional e-coupon revenue from all sellers, subject to the sellers all adopting best thresholds respectively. For example, this objective can be addressed by maximizing the conditional e-coupon revenue that the conditional e-coupon service provider earns from one seller in every processing cycle.

The objective for mobile users is to maximize the ratio of the number of received e-coupons versus the number of requests, subject to all candidate sellers adopting their best thresholds respectively. The same optional consolidation process done by the conditional e-coupon service provider achieves this objective; this maximizes the number of sellers that can eventually meet the threshold requirement and thus distribute their e-coupons to mobile users.

Best Threshold—Flat Advertising Price Plan

Under the flat advertising price plan $p(N)=p_o$, the best threshold for a seller is equal to $\lceil p_o/mr \rceil$, no matter what kind of statistical distribution N obeys, where $\lceil x \rceil$ is the smallest integer that is no smaller than x.

Let $\theta_m$ denote the best threshold and let $P(\theta_m)$ denote the maximum conditional e-coupon profit. That is, $$P(\theta_m) = \text{Max}\{P(\theta)\} = \sum_{n=\theta_m}^{\infty} (mrn - p_o)Pr(N = n)$$

Assume $\theta_m = \theta' < p_o/mr$, we have $$P(\theta_m) = \sum_{n=\theta'}^{\lceil \frac{p_0}{mr} \rceil - 1} (mrn - p_0)Pr(N = n) + \sum_{n=\lceil \frac{p_0}{mr} \rceil}^{\infty} (mrn - p_0)Pr(N = n)$$

Because the first term in the right side of the above equation is always negative, we have, $$P(\theta_m) < \sum_{n=\lceil \frac{p_0}{mr} \rceil}^{\infty} (mrn - p_0)Pr(N = n) = P\left(\left\lceil \frac{p_0}{mr} \right\rceil\right)$$

This is contradictory to the assumption that $P(\theta_m)$ is the maximum conditional e-coupon profit, so it has to be $\theta_m \geq p_o/mr$.

Similarly, assume $\theta_m = \theta' > p_o/mr$, we have $$P(\theta_m) = \sum_{\theta'}^{\infty} (mrn - p_0)Pr(N = n) <$$

$$\sum_{n=\lceil \frac{p_0}{mr} \rceil}^{\theta'-1} (mrn - p_0)Pr(N = n) + \sum_{\theta'}^{\infty} (mrn - p_0)Pr(N = n)$$

$$= P\left(\left\lceil \frac{p_0}{mr} \right\rceil\right)$$

This is because the first term in the second row of the above equation is always positive. This is also contradictory to the assumption that $P(\theta_m)$ is the maximum conditional e-coupon profit, so it has to be that $\theta_m \leq p_o/mr$.

Combining these results, we have $\theta_m = p_o/mr$. It should be noted that the function form of Pr(N=n) is not needed. That is, the best threshold $\theta_m$ does not depend on the statistical distribution of N.

The independence between the best threshold $\theta_m$ and the statistical distribution of N is a feature for the conditional e-coupon service, which makes it easy for the conditional e-coupon controller to choose the best threshold that is valid all the time for every seller.

Best Threshold—Proportional Advertising Price Plan

Under the proportional advertising price plan $p(N)=p_1N$, the best threshold for a seller is equal to 1 if $p_1<mr$, or infinity if $p_1 \geq mr$.

Plugging $p(N)=p_1N$ into $P(\theta)$, we have, $$P(\theta) = \sum_{n=\theta}^{\infty} (mr - p_1)n Pr(N=n)$$

Note that $n\,Pr(N=n) \geq 0$ for any n. If $p_1 \geq mr$, i.e., $mr-p_1 \leq 0$, we have $P(\theta) \leq 0$. In this case, the maximum conditional e-coupon profit is zero only if $\theta \to \infty$, which means the seller cannot issue e-coupons no matter how many requests are pending.

If $p_1 < mr$, i.e., $mr-p_1 > 0$, we have $(mr-p_1)n Pr(N=n) > 0$ for ever n. Clearly, Max $\{P(\theta)\}=P(1)$, which means the seller should issue e-coupons as long as there are pending requests.

Similarly, the function form of $Pr(N=n)$ is not needed. That is, the best threshold $\theta_m$ doesn't depend on the statistical distribution of N.

Best Threshold—Linear Advertising Price Plan

Under the linear advertising price plan $p(N)=p_0+p_1N$, the best threshold for a seller is equal to $$\left\lceil \frac{p_0}{mr - p_1} \right\rceil$$

if $p_1 < mr$, or infinity if $p_1 > mr$.

Plugging $p(N)=p_0+p_1N$ into $P(\theta)$, we have, $$P(\theta) = \sum_{n=\theta}^{\infty} ((mr - p_1)n - p_0) Pr(N=n)$$

If $p_1 \geq mr$, i.e., $mr-p_1 \leq 0$, we have $((mr-p_1)n-p_0)Pr(N=n) \leq 0$ for every n. Hence, $P(\theta) \leq 0$. In this case, the maximum conditional e-coupon profit is zero when $\theta \to \infty$, which means the seller cannot issue e-coupons no matter how many requests are pending.

If $p_1 < mr$, i.e., $mr-p_1 > 0$, following the same proving method used in the calculation based upon the Flat Advertising Price Plan above, the best threshold is equal to $$\left\lceil \frac{p_0}{mr - p_1} \right\rceil.$$

Again, the function form of $Pr(N=n)$ is not needed. That is, the best threshold doesn't depend on the statistical distribution of N.

From the above calculations, it can be seen that the best threshold $\theta_m$ is always independent of the statistical distribution of N. This is a nice feature, which makes it very easy for the commerce server to choose the best threshold without a statistical model for N.

Figure 10:
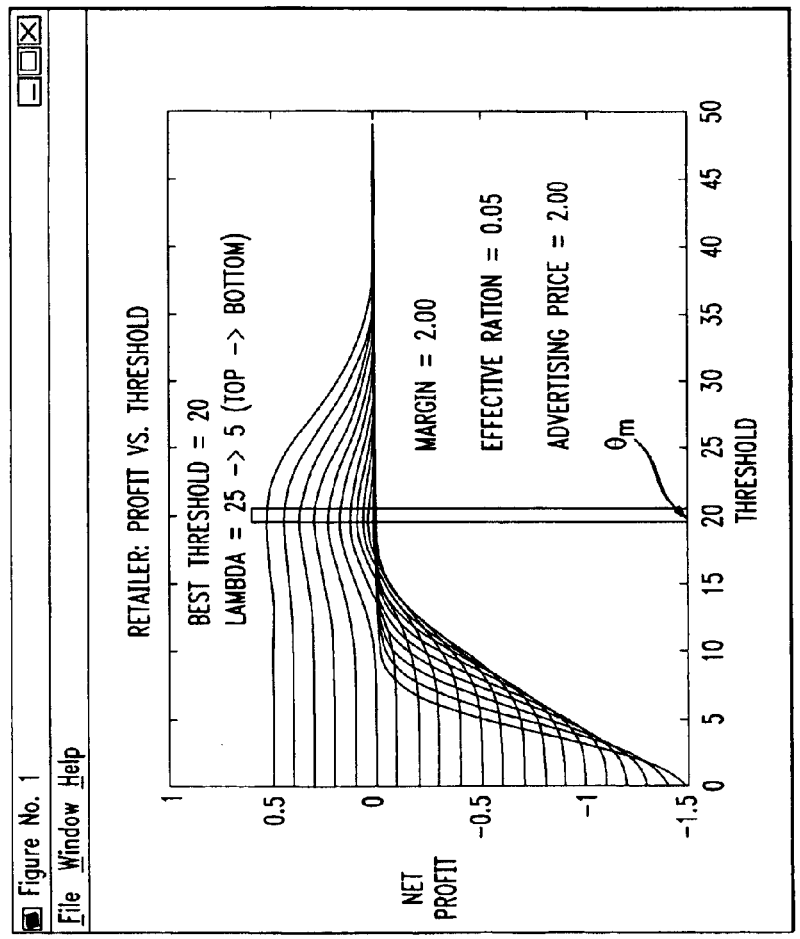
FIG. 10 shows a conditional e-coupon profit versus a threshold curve.

A "conditional e-coupon profit vs. threshold" curve for a participating seller is shown in FIG. 10, where 21 curves are plotted from top to bottom, corresponding to the cases that N obeys a Poisson distribution with an arriving rate λ varying from 25 to 5. The flat advertising price p is 2.00, the pre-advertising profit margin m is 2.00, and the effectiveness ratio r is 0.05. FIG. 10 shows that, no matter how λ changes, the best threshold $\theta_m$ corresponding to the maximum conditional e-coupon profit $P(\theta_m)$ is always equal to 20.

Maximum Conditional E-Coupon Profit

Another property for the best threshold is the maximum conditional e-coupon profit recited herein. When choosing the best threshold $\theta_m$, a participating seller can earn a positive maximum conditional e-coupon profit $P(\theta_m)$, no matter how expensive the advertising price $p(N)$ is.

It should be noted that the maximum conditional e-coupon profit $P(\theta_m)$ does depend on the statistical distribution of N, although the best threshold $\theta_m$ does not. If N obeys a Poisson distribution with an arriving rate λ, where $Pr(N)$ is the Poisson probability distribution function with an arriving rate of λ, i.e., $$Pr(N=n) = \frac{\lambda^n}{n!}e^{-\lambda}$$

Under the flat advertising price plan the maximum conditional e-coupon profit $P(\theta_m)$ is:

$$P(\theta_m) = mr\lambda Pr\left(N \geq \left\lceil \frac{p_0}{mr} \right\rceil - 1\right) - p_0 Pr\left(N \geq \left\lceil \frac{p_0}{mr} \right\rceil\right)$$

Under the proportional advertising price plan with $p_1 < mr$, the maximum conditional e-coupon profit is given by:

$P(\theta_m)=(mr-p_1)\lambda$

And under the linear advertising price plan with $p_1 < mr$, the maximum conditional e-coupon profit is given by:

$$P(\theta_m) = (mr - p_1)\lambda Pr\left(N \geq \left\lceil \frac{p_0}{mr-p_1} \right\rceil\right) - p_0 Pr\left(N \geq \left\lceil \frac{p_0}{mr-p_1} \right\rceil\right)$$

Figure 11:
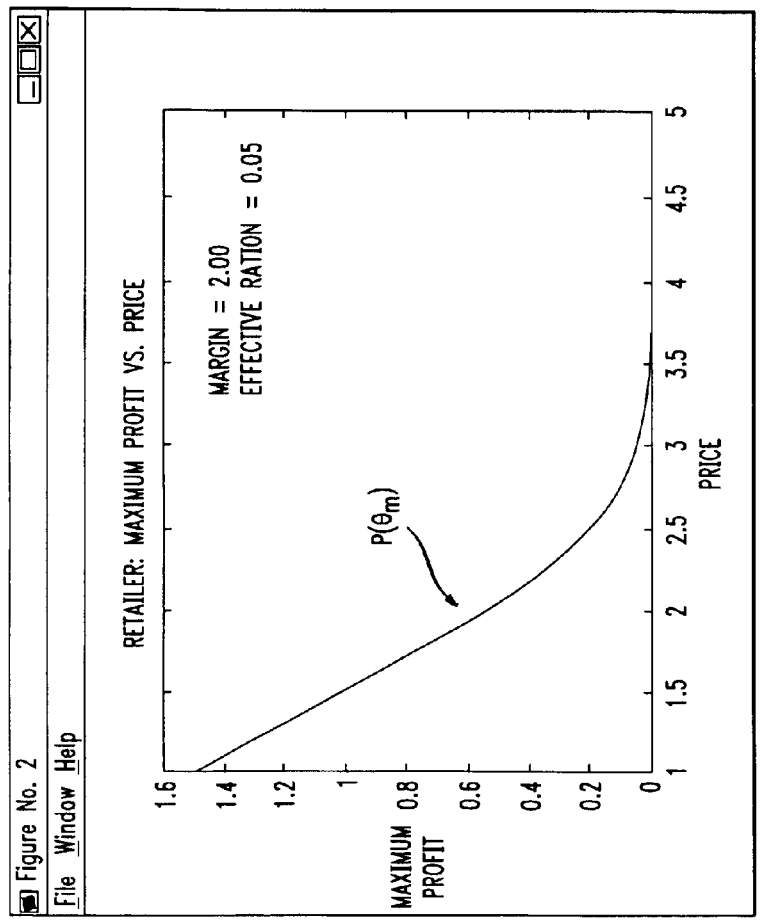
FIG. 11 shows a maximum conditional e-coupon profit versus an advertising price curve.

A "maximum conditional e-coupon profit vs. price" curve for a participating seller is shown in FIG. 11, where N obeys a Poisson distribution with an arriving rate λ=35. The pre-advertising profit margin m is 2.00 and the effectiveness ratio r is 0.05. It can be seen that the maximum conditional e-coupon profit $P(\theta_m)$ for the seller will always be positive, although the profit approaches to zero rapidly as the advertising price p increases. Pursuant to these equations, a seller will make money under any circumstances in a statistical sense.

Upper Bound Of Price

Figure 12:
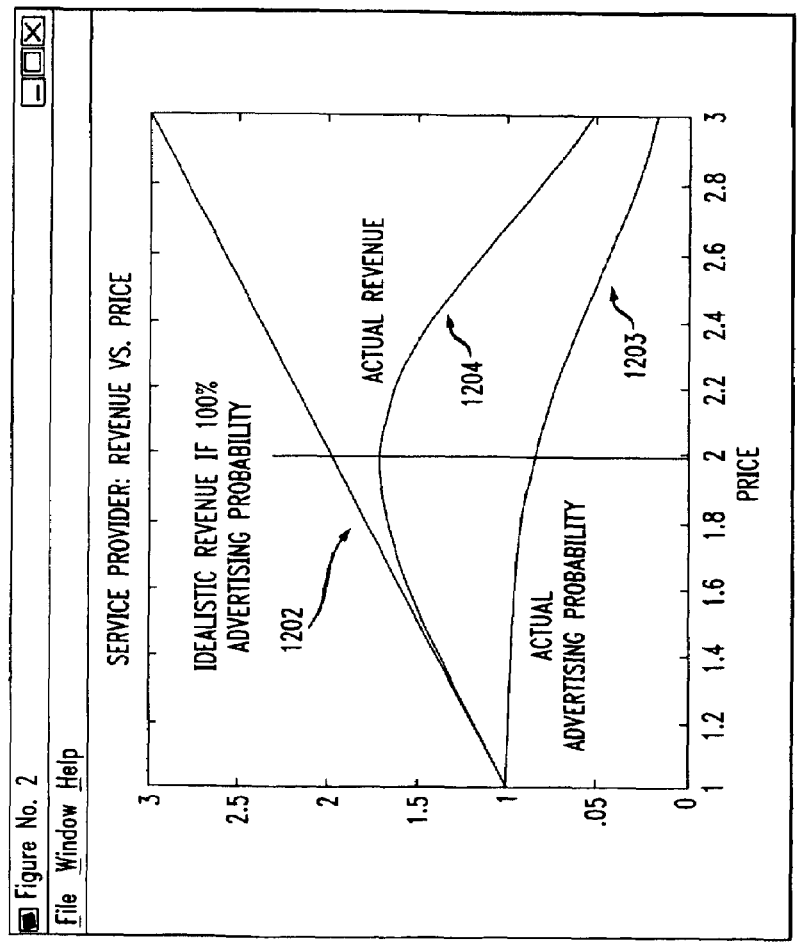
FIG. 12 shows a maximum conditional e-coupon revenue versus advertising price curve.

If a flat advertising price plan is adopted, there exists an upper bound of the advertising price $p_o$ for the conditional e-coupon service provider to charge every seller for each distributed e-coupon. The conditional e-coupon service provider can make the maximum conditional e-coupon revenue from a seller if the advertising price $p_o$ is set to be the upper bound, and there is no advantage in using a higher price. FIG. 12 demonstrates this correlation between the maximum conditional e-coupon revenue and the upper bound of the advertising price $p_o$.

In FIG. 12, the line 1202 on the top shows that the ideal conditional e-coupon revenue that a conditional e-coupon service provider can earn from every distributed e-coupon for a seller increases linearly as the advertising price $p_o$ increases. However, line 1202 is the ideal case, assuming the seller chooses an unconditional e-coupon distribution scheme. If the seller chooses the conditional e-coupon service with the best threshold, the best threshold increases rapidly as the advertising price increases. This causes the probability of distributing e-coupons for the seller to decrease rapidly, which is shown by line 1203. Therefore, there exists the maximum conditional e-coupon revenue for the conditional e-coupon service provider to earn from the seller at some price point, as shown by line 1204. This advertising price is the upper bound price, because even if the conditional e-coupon service provider sets a higher price, he cannot earn more conditional e-coupon revenue. The value of the upper bound advertising price depends on the statistical distribution of N.

If a proportional advertising price plan is adopted, there exists an upper bound for the unit advertising price $p_1$ that the conditional e-coupon service provider charges a seller for every e-coupon in each e-coupon distribution. Clearly, the upper bound is equal to mr. The conditional e-coupon service provider can set a unit price close to the upper bound but cannot make it equal to the upper bound, because the store cannot make profit at all in this scenario.

If a linear advertising price plan is adopted, there exists an upper bound for the flat advertising price $p_0$ as well as an upper bound for the unit advertising price $p_1$. The upper bound for the unit advertising price $p_1$ is equal to mr. The upper bound for the flat advertising price $p_0$ is dependent of the unit advertising price $p_1$ as well as the distribution function of N.

In one example, a conditional e-coupon service provider sets the advertising price below the upper bound in order to expand the base of sellers and to compete with other conditional e-coupon service providers.

Optimal Consolidation

At the end of every processing cycle, the commerce server may find that some sellers have insufficient pending request to warrant an e-coupon distribution. This does not mean that all of these sellers cannot issue their e-coupons. Some of them may become eligible after others are declared hopeless by the commerce server, because the overall e-coupon effectiveness ratio of the remaining sellers can increase significantly due to less competition after others quit the game. Clearly, there is an optimization problem—the commerce server must follow an optimal procedure to selectively remove sellers from the candidate sellers, such that the number of remaining sellers that eventually become eligible to issue e-coupons is maximized. This optimal consolidation process guarantees mobile users receive a maximum number of e-coupons, provided that all issuing stores can make maximum profit. It also guarantees the conditional e-coupon service provider can make maximum revenue after the advertising price is determined.

Assume that N e-coupon request arrive at the commerce server in a processing cycle. Each of them has an individual redeem probability of $r_n$, n=1, 2, . . . , N, which are estimated from the quota system in the last quota reset cycle. They are pending at L sellers with various competition factors $d_{ln}$, where $d_{ln}$ is the competition factor for the $n^{th}$ request pending at the $l^{th}$ store. It can take either of two values. One is zero, which means the $n^{th}$ request is not a pending request to the $l^{th}$ store. The other is equal to one divided by $c_n$, which is the number of candidate sellers for the $l^{th}$ request. For the $l^{th}$ store, there are in total $N_l$ pending requests. We have $1 \leq c_n \leq L$. Without loss of generality, we assume none of the sellers has a sufficient number of pending requests that can warrant an e-coupon distribution in the beginning of the consolidation process. We define an eligibility distance $D_l(i)$, l=1, 2, . . . , L, for every seller, $$D_l(i) = p_l - m \sum_{n=1}^{N} r_n d_{ln}$$

where i is the iteration index.

Because derivation of a globally optimal consolidation algorithm is a difficult problem, a sub-optimal algorithm is given below.

(1) The commerce server calculates the eligibility distance for every remaining seller at Step i and finds the maximum eligibility distance $\text{Max}\{D_l(i)\}$;

(2) If $\text{Max}\{D_l(i)\} \leq 0$ or none is remaining, the commerce server stops the consolidation process and distributes e-coupons for all remaining sellers, if there are any remaining sellers. Otherwise, the algorithm continues.

(3) If there is only one seller associated with $\text{Max}\{D_l(i)\}$, this seller is declared hopeless and removed from the candidate sellers. Otherwise, the commerce server randomly chooses one of such sellers and declares it hopeless.

(4) i=i+1, go to (1).

Figure 13A:
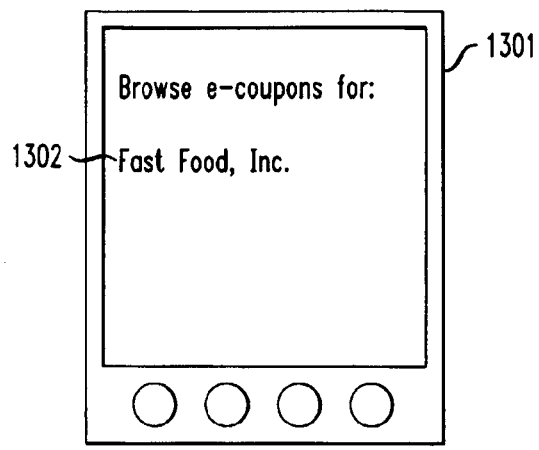
FIGS. 13A through 13E show an example of how a mobile user might interact with the present invention.

FIGS. 13A-13E show an example of how a mobile user might interact with on embodiment of the present invention. A mobile user drives by a fast food restaurant, such as Fast Food, Inc. (fictional name), and decides to get a meal. Fast Food, Inc. is a seller that maintains e-coupons through the conditional e-coupon service provider. As shown in FIG. 13A, the mobile user can make a request to the conditional e-coupon service provider to browse the e-coupons available for Fast Food, Inc. by inputting the seller name, as shown by reference character 1302. In this example, the mobile user can make the request on a Personal Digital Assistant (PDA) device 1301.

Figure 13B:

As disclosed above in one embodiment, the present invention receives the request to browse e-coupons available for Fast Food, Inc., determines a plurality of Fast Food, Inc. locations (or stores) that are local to this mobile user and a plurality of corresponding e-coupons from each Fast Food, Inc. location. As shown in FIG. 13B, a mobile user receives the e-coupon availability data of local Fast Food, Inc. and e-coupons available for each. The first screen on the PDA could show the Fast Food, Inc. that is physically closest to the mobile user. In this case, the PDA has received a location at 110 Pine St., as shown by reference numeral 1303, and all the corresponding e-coupons available for that particular Fast Food, Inc., as shown by reference numeral 1304.

Figure 13C:
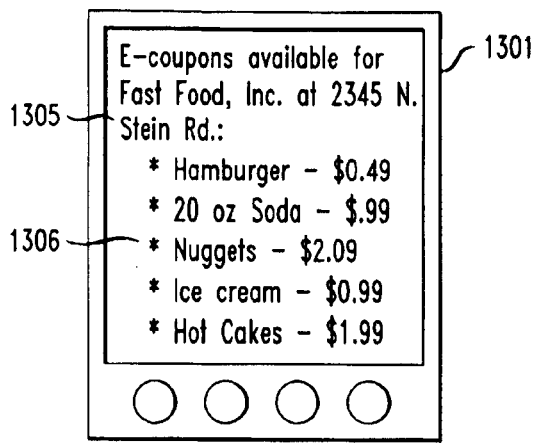

FIG. 13C represents what the mobile user may see on a separate page. The location of this Fast Food, Inc. at 2345 N. Stein Rd. 1305 could be the second closest Fast Food, Inc. in physical location to the mobile user. A listing, as shown by reference numeral 1306, of all available e-coupons for that particular Fast Food, Inc. location is also shown. Multiple locations of various locations could be listed on one screen.

Figure 13D:
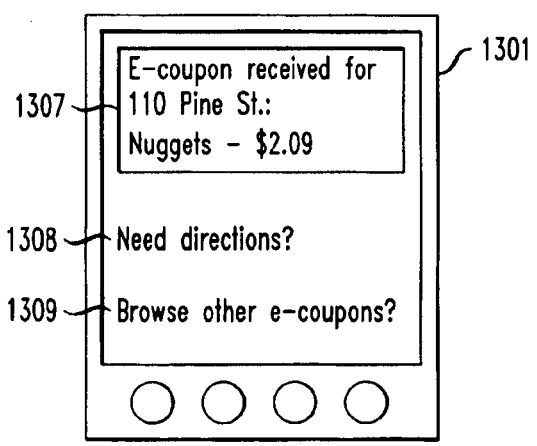
Figure 13E:
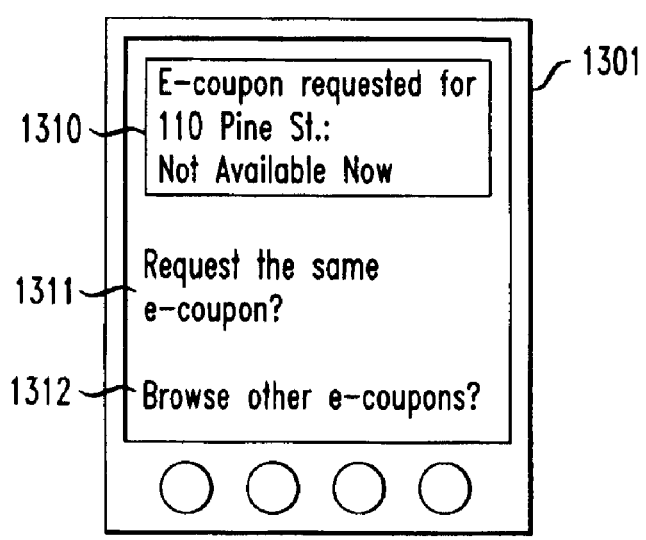

Should the mobile user choose a particular e-coupon, such as the e-coupon for a Nuggets from the 110 Pine St. Fast Food, Inc. location, the present invention would receive the request for the e-coupon and then authorize whether the e-coupon should be distributed as disclosed above. FIG. 13D and 13E show two possible screens that may be seen from the authorization step of the present invention.

In the case that the e-coupon is distributed, FIG. 13D shows receipt, as shown by reference numeral 1307, of the requested e-coupon from the particular Fast Food, Inc. location. With the e-coupon, the mobile user can redeem the e-coupon at the particular location and receive the desired Nuggets at the e-coupon price or discount.

In the case that the e-coupon is not distributed, FIG. 13E shows a notification message, as shown by reference numeral 1310, stating that the e-coupon was not available for that request. Again, other options may be available, such as a prompt to request the same e-coupon again, as shown by reference numeral 1311, and a prompt to browse for other e-coupons, as shown by reference numeral 1312.

As shown in FIGS. 13D and 13E, some examples of further options the system could provide are an option to receive driving directions, reference numeral 1308, to the seller, request the same e-coupon, reference numeral 1311, and an option to browse for other e-coupons, reference numerals 1309 and 1312. In addition, the system could automatically log a request for the same e-coupon during a second processing cycle if the first processing cycle ended without a distribution of the desired e-coupon. This automatic feature of the present invention could be a field in a mobile user or seller profile, such as field 622f or 633l.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An e-coupon distribution method for distributing e-coupons redeemable for value in the purchase of goods or services from a seller, comprising:
   receiving a request from a mobile electronic device of a user to browse at least one e-coupon;
   receiving location information for the requesting mobile electronic device;
   determining at least one seller local to the location of the mobile electronic device and at least one corresponding e-coupon available from said at least one seller;
   sending e-coupon availability data to the mobile electronic device;
   receiving a request for at least one e-coupon of a seller from the mobile electronic device;
   determining whether to provide said seller's e-coupon to the mobile electronic device in response to the request by
      determining the number of pending mobile requests during a processing cycle;
      calculating an initial threshold number of requests for the processing cycle based at least in part on the seller's margin for the goods or services associated with the e-coupon and estimated rates of e-coupon redemption,
      authorizing the provision of said e-coupon when the number of pending mobile requests during the processing cycle is equal to or greater than the threshold number; and
   sending said e-coupon to the mobile electronic device upon authorization;
   wherein an advertising fee is charged for the e-coupon and said initial threshold is determined by dividing the advertising fee by a product of the estimated rate of e-coupon redemption times the seller's margin for the goods or services associated with the e-coupon.

2. An e-coupon distribution method for distributing e-coupons redeemable for value in the purchase of goods or services from a seller, comprising:
   (i) maintaining a mobile user profile and seller profile data in database memory;
   (ii) receive a request for at least one e-coupon from a mobile electronic device of a user;
   (iii) receiving location information for the requesting mobile electronic device;
   (iv) determining a seller local to the location of the mobile electronic device;
   (v) determining an initial threshold number of requests for the seller based on the seller's margin for the goods or services associated with the e-coupon, the advertising fee charged for the distribution of the e-coupon, and estimated rates of e-coupon redemption;
   (vi) determining whether the number of pending requests for said e-coupon is greater than or equal to the initial threshold; and
   (vii) when the number of pending requests for said e-coupon is greater than or equal to the initial threshold, sending said e-coupon to the mobile electronic device;
   further comprising, when the number of pending requests for said e-coupon is determined to be less than the seller's initial threshold, the following additional steps:
   (viii) applying an optimizing consolidation process to the seller including eliminating at least one other seller to obtain increased estimated rates of e-coupon redemption and using such increased estimated rates of e-coupon redemption to determine an optimized threshold number;
   (ix) determining whether the number of pending requests for said e-coupon is greater than or equal to the optimized threshold number; and
   (x) when the number of pending requests for said e-coupon is greater than or equal to the optimized threshold number, sending said e-coupon to the mobile electronic device.

3. The e-coupon distribution method of claim 2, further comprising, when in step (ix) the number of pending requests for said e-coupon is determined to be less than the optimized threshold number, the additional step of sending a notification to the mobile user that no e-coupon for the seller will be provided.

4. The e-coupon distribution method of claim 3 further comprising logging said request for the e-coupon from the seller in said user profile and said seller profile.

5. An e-coupon distribution method for distributing e-coupons redeemable for value in the purchase of goods or services from a seller, comprising:
   receiving a request from a mobile electronic device of a user to browse at least one e-coupon;
   receiving location information for the requesting mobile electronic device;
   determining at least one seller local to the location of the mobile electronic device and at least one corresponding e-coupon available from said at least one seller;
   sending e-coupon availability data to the mobile electronic device;
   receiving a request for at least one e-coupon of a seller from the mobile electronic device;
   determining whether to provide said seller's e-coupon to the mobile electronic device in response to the request by determining the number of pending mobile requests during a processing cycle;

calculating an initial threshold number of requests for the processing cycle based at least in part on the seller's margin for the goods or services associated with the e-coupon and estimated rates of e-coupon redemption, authorizing the provision of said e-coupon when the number of pending mobile requests during the processing cycle is equal to or greater than the threshold number; and sending said e-coupon to the mobile electronic device upon authorization;

maintaining mobile user profile data and seller profile data in database memory;

maintaining in the mobile user profile a quota of e-coupons the user is allowed to receive;

receiving a notification that said mobile electronic device is at the location of said seller;

receiving said seller location information;

determining whether said e-coupon sent to the mobile user has been redeemed; and upon determining said e-coupon has been redeemed, increasing the quota of e-coupons by one in the mobile user profile.

6. An e-coupon distribution method for distributing e-coupons redeemable for value in the purchase of goods or services from a seller, comprising:

receiving a request from a mobile electronic device of a user to browse at least one e-coupon;

receiving location information for the requesting mobile electronic device;

determining at least one seller local to the location of the mobile electronic device and at least one corresponding e-coupon available from said at least one seller;

sending e-coupons availability data to the mobile electronic device;

receiving a request for at least one e-coupon of a seller from the mobile electronic device;

determining whether to provide said seller's e-coupon to the mobile electronic device in response to the request by determining the number of pending mobile requests during a processing cycle;

calculating an initial threshold number of requests for the processing cycle based at least in part on the seller's margin for the goods or services associated with the e-coupon and estimated rates of e-coupon redemption, authorizing the provision of said e-coupon when the number of pending mobile requests during the processing cycle is equal to or greater than the threshold number; and sending said e-coupon to the mobile electronic device upon authorization;

wherein the step of determining whether to provide said seller's e-coupon to the mobile electronic device in response to the mobile request further comprises:

determining the sellers having pending numbers of requests for an e-coupon that are not greater than or equal to the initial threshold calculated for them, and applying an optimizing consolidation process to all sellers with insufficient pending requests, including eliminating at least one such seller to obtain increased estimated rates of e-coupon redemption, recalculating using such increased estimated rates of e-coupon redemption to determine an optimized threshold number, and authorizing the provision of said e-coupon when the number of pending mobile requests during the processing cycle is greater than or equal to the optimized threshold number.

7. An e-coupon distribution system for distributing e-coupons redeemable for value in the purchase of goods or services from a seller, comprising:

a memory for storing mobile user profile data and seller profile data;

a profile proxy server to receive a request to browse at least one e-coupon from a mobile electronic device of a user;

said profile proxy server to receive a location of the requesting mobile electronic device;

said profile proxy server to determine a at least one seller local to the location of the mobile electronic device and at least one corresponding e-coupon available from said sellers;

said profile proxy server to send e-coupon availability data to the mobile electronic device;

said profile proxy server to receive a request for at least one e-coupon of a seller from the mobile electronic device;

a commerce server to receive said request from said profile proxy server;

said commerce server to log said request in said mobile user profile and said seller profile;

said commerce server to determine whether to provide said seller's e-coupon to the mobile electronic device in response to the request by determining the number of pending mobile requests during a processing cycle;

calculating an initial threshold number of requests for the processing cycle based at least in part on the seller's margin for the goods or services associated with the e-coupon, and estimated rates of e-coupon redemption;

at the end of the processing cycle, said commerce server to authorize the provision of said e-coupon when the number of pending mobile requests during the processing cycle is equal to or greater than the threshold number; and said commerce server to send said e-coupon to the mobile electronic device responsive to said authorizing step;

wherein an advertising fee is charged for the e-coupon distribution and said initial threshold is determined by dividing the advertising fee by a product of the estimated rate of e-coupon redemption times the seller's e-coupon margin for the goods or services associated with the e-coupon.

8. The e-coupon distribution system of claim 7 wherein upon receiving the request for at least one e-coupon from the mobile electronic device, said profile proxy server sends a reply message to the mobile electronic device.

9. The e-coupon distribution system of claim 8 wherein said reply message comprises a quota of e-coupons available to the user and an expected time to receive said e-coupon.

10. The e-coupon distribution system of claim 9 wherein said commerce server logs said request in said mobile user profile and said seller profile, and the commerce server:

creates a mobile user pending request record in the mobile user profile;

decreases the quota of e-coupons in the mobile user profile by one;

creates a seller pending request record in the seller profile; and increases the estimated number of coupons provided to users for redemption in the seller profile.

11. An e-coupon distribution system for distributing e-coupons redeemable for value in the purchase of goods or services from a seller, comprising:
a memory for storing mobile user profile data and seller profile data;
a profile proxy server to receive a request to browse at least one e-coupon from a mobile electronic device of a user;
said profile proxy server to receive a location of the requesting mobile electronic device;
said profile proxy server to determine a at least one seller local to the location of the mobile electronic device and at least one corresponding e-coupon available from said sellers;
said profile proxy server to send e-coupon availability data to the mobile electronic device;
said profile proxy server to receive a request for at least one e-coupon of a seller from the mobile electronic device;
a commerce server to receive said request from said profile proxy server;
said commerce server to log said request in said mobile user profile and said seller profile;
said commerce server to determine whether to provide said seller's e-coupon to the mobile electronic device in response to the request by
determining the number of pending mobile requests during a processing cycle;
calculating an initial threshold number of requests for the processing cycle based at least in part on the seller's margin for the goods or services associated with the e-coupon, and estimated rates of e-coupon redemption;
at the end of the processing cycle, said commerce server to authorize the provision of said e-coupon when the number of pending mobile requests during the processing cycle is equal to or greater than the threshold number, and said commerce server to send e-coupon to the mobile electronic device responsive to said authorizing step;
said profile proxy server to receive a notification that said mobile electronic device is at the location of said seller;
said profile proxy server to receive said seller location information;
said commerce server to determine whether said e-coupon sent to the mobile user has been redeemed; and
upon determining said e-coupon has been redeemed, said commerce server to increase the quota of e-coupons by one in the mobile user profile.

12. An e-coupon distribution system for distributing e-coupons redeemable for value in the purchase of goods or services from a seller, comprising:
a memory for storing mobile user profile data and seller profile data;
a profile proxy server to receive a request to browse at least one e-coupon from a mobile electronic device of a user;
said profile proxy server to receive a location of the requesting mobile electronic device;
said profile proxy server to determine a at least one seller local to the location of the mobile electronic device and at least one corresponding e-coupon available from said sellers;
said profile proxy server to send e-coupon availability data to the mobile electronic device;
said profile proxy server to receive a request for at least one e-coupon of a seller from the mobile electronic device;
a commerce server to receive said request from said profile proxy server;
said commerce server to log said request in said mobile user profile and said seller profile;
said commerce server to determine whether to provide said seller's e-coupon to the mobile electronic device in response to the request by
determining the number of pending mobile requests during a processing cycle;
calculating an initial threshold number of requests for the processing cycle based at least in part on the seller's margin for the goods or services associated with the e-coupon, and estimated rates of e-coupon redemption;
at the end of the processing cycle, said commerce server to authorize the provision of said e-coupon when the number of pending mobile requests during the processing cycle is equal to or greater than the threshold number; and said commerce server to send e-coupon to the mobile electronic device responsive to said authorizing step;
wherein upon determining said number of pending requests is greater than or equal to said initial threshold, said commerce server:
creates a pending coupon record in the seller profile;
sends said pending coupon record to the seller via the seller instant contact address;
creates a pending record of coupons available for redemption in the mobile user profile; and
sends the pending record of coupons available for redemption to the mobile electronic device.

13. A computer program product for use with an output device, said computer program product comprising:
a computer-usable medium having computer-readable program code embodied in said medium for causing a distribution of e-coupons redeemable for value in the purchase of goods or services from a seller, said computer program product having:
computer-readable program code for causing a computer to maintain mobile user profile and seller profile data in database memory;
computer-readable program code for causing a computer to receive a request to browse at least one e-coupon from a mobile electronic device of a user;
computer-readable program code for causing a computer to receive a location of the requesting mobile electronic device;
computer-readable program code for causing a computer to determine a plurality of sellers local to the location of the mobile electronic device and a plurality of corresponding e-coupons available from said sellers;
computer-readable program code for causing a computer to provide e-coupon availability data to the mobile electronic device;
computer-readable program code for causing a computer to receive a request for at least one e-coupon of a seller from the mobile electronic device;
computer-readable program code for causing a computer to log said request for an e-coupon of a seller in said mobile user profile and said seller profile;
computer-readable program code for causing a computer to determine whether to provide said seller's e-coupon to the mobile electronic device in response to the request by
determining the number of pending mobile requests during a processing cycle;
calculating an initial threshold number of requests for the processing cycle based at least in part on the seller's margin for the goods or services associated with the e-coupon and estimated rates of e-coupon redemption;

computer-readable program code for causing a computer, at the end of the processing cycle, to authorize the provision of said e-coupon when the number of pending mobile requests during the processing cycle is equal to or greater than the threshold number; and computer-readable program code for causing a computer to provide said e-coupon to the mobile electronic device responsive to said authorizing step;

wherein the computer-readable program code for calculating an initial threshold divides an advertising fee charged for the e-coupon by a product of the estimated rate of e-coupon redemption times the seller's margin for the goods or services associated with the e-coupon.

14. A computer program product for use with an output device, said computer program product comprising:

a computer-usable medium having computer-readable program code embodied in said medium for causing a distribution of e-coupons redeemable for value in the purchase of goods or services from a seller, said computer program product having:

computer-readable program code for causing a computer to maintain mobile user profile and seller profile data in database memory;

computer-readable program code for causing a computer to receive a request to browse at least one e-coupon from a mobile electronic device of a user;

computer-readable program code for causing a computer to receive a location of the requesting mobile electronic device;

computer-readable program code for causing a computer to determine a plurality of sellers local to the location of the mobile electronic device and a plurality of corresponding e-coupons available from said sellers;

computer-readable program code for causing a computer to provide e-coupon availability data to the mobile electronic device;

computer-readable program code for causing a computer to receive a request for at least one e-coupon of a seller from the mobile electronic device;

computer-readable program code for causing a computer to log said request for an e-coupon of a seller in said mobile user profile and said seller profile;

computer-readable program code for causing a computer to determine whether to provide said seller's e-coupon to the mobile electronic device in response to the request by determining the number of pending mobile requests during a processing cycle;

calculating an initial threshold number of requests for the processing cycle based at least in part on the seller's margin for the goods or services associated with the e-coupon and estimated rates of e-coupon redemption;

computer-readable program code for causing a computer, at the end of the processing cycle, to authorize the provision of said e-coupon when the number of pending mobile requests during the processing cycle is equal to or greater than the threshold number; and computer-readable program code for causing a computer to provide said e-coupon to the mobile electronic device responsive to said authorizing step;

computer-readable program code for causing a computer to maintain in the mobile user profile a quota of e-coupons the user is allowed to receive;

computer-readable program code for causing a computer to receive a notification that said mobile electronic device is at the location of said seller;

computer-readable program code for causing a computer to receive said seller location information;

computer-readable program code for causing a computer to determine whether said e-coupon sent to the mobile user has been redeemed; and upon determining said e-coupon has been redeemed, increasing the quota of e-coupons by one in the mobile user profile.

15. A computer program product for use with an output device, said computer program product comprising:

a computer-usable medium having computer-readable program code embodied in said medium for causing a distribution of e-coupons redeemable for value in the purchase of goods or services from a seller, said computer program product having:

computer-readable program code for causing a computer to maintain mobile user profile and seller profile data in database memory;

computer-readable program code for causing a computer to receive a request to browse at least one e-coupon from a mobile electronic device of a user;

computer-readable program code for causing a computer to receive a location of the requesting mobile electronic device;

computer-readable program code for causing a computer to determine a plurality of sellers local to the location of the mobile electronic device and a plurality of corresponding e-coupons available from said sellers;

computer-readable program code for causing a computer to provide e-coupon availability data to the mobile electronic device;

computer-readable program code for causing a computer to receive a request for at least one e-coupon of a seller from the mobile electronic device;

computer-readable program code for causing a computer to log said request for an e-coupon of a seller in said mobile user profile and said seller profile;

computer-readable program code for causing a computer to determine whether to provide said seller's e-coupon to the mobile electronic device in response to the request by determining the number of pending mobile requests during a processing cycle;

calculating an initial threshold number of requests for the processing cycle based at least in part on the seller's margin for the goods or services associated with the e-coupon and estimated rates of e-coupon redemption;

computer-readable program code for causing a computer, at the end of the processing cycle, to authorize the provision of said e-coupon when the number of pending mobile requests during the processing cycle is equal to or greater than the threshold number; and computer-readable program code for causing a computer to provide said e-coupon to the mobile electronic device responsive to said authorizing step;

wherein the computer-readable program code for causing a computer to determine whether to provide said seller's e-coupon to the mobile electronic device in response to the mobile request further comprises computer readable program code for:

determining the sellers having pending requests for an e-coupon that is not greater than or equal to the initial threshold calculated for them, and applying an optimizing consolidation process to all sellers with insufficient pending requests, including eliminating at least one such seller to obtain increased estimated rates of e-coupon redemption, recalculating using such increased estimated rates of e-coupon redemption to determine an optimized threshold number, and authorizing the provision of said e-coupon when the number of pending mobile requests during the processing cycle is greater than or equal to the optimized threshold number.

* * * * *